US007763217B2

(12) United States Patent
Whyatt et al.

(10) Patent No.: US 7,763,217 B2
(45) Date of Patent: Jul. 27, 2010

(54) RAPID START FUEL REFORMING SYSTEMS AND TECHNIQUES

(75) Inventors: Greg A. Whyatt, West Richland, WA (US); Christopher M. Fischer, Yakima, WA (US); James M. Davis, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1142 days.

(21) Appl. No.: 10/551,516

(22) PCT Filed: May 17, 2004

(86) PCT No.: PCT/US2004/015402
§ 371 (c)(1),
(2), (4) Date: Sep. 28, 2005

(87) PCT Pub. No.: WO2004/104140
PCT Pub. Date: Dec. 2, 2004

(65) Prior Publication Data
US 2006/0179718 A1 Aug. 17, 2006

Related U.S. Application Data

(60) Provisional application No. 60/471,130, filed on May 16, 2003, provisional application No. 60/471,286, filed on May 16, 2003, provisional application No. 60/546,107, filed on Feb. 18, 2004.

(51) Int. Cl.
*B01J 8/00* (2006.01)

(52) U.S. Cl. .......... 422/190; 422/188; 422/189; 422/191; 422/198; 422/211; 422/187; 422/200; 48/61; 48/127.9; 48/127.7; 429/19; 429/20; 423/650; 423/648.1; 423/651; 423/652

(58) Field of Classification Search .......... 422/180–197
See application file for complete search history.

(56) References Cited

U.S. PATENT DOCUMENTS 3,176,763 A * 4/1965 Franklin ............... 165/166

(Continued)

OTHER PUBLICATIONS

Whyatt et al., "Progress on the Development of a Microchannel Steam Reformer for Automotive Applications," Presentation at the AIChE 2002 Spring National Meeting, IMRET 6—6th International conference on Microreaction Technology, Mar. 10-14, 2002, New Orleans, Louisiana.

(Continued)

*Primary Examiner*—Alexa D. Neckel
*Assistant Examiner*—Kaity V. Handal
(74) *Attorney, Agent, or Firm*—Klarquist Sparkman, LLP

(57) ABSTRACT

An on-board fuel processor includes a microchannel steam reforming reactor (30) and a water vaporizer (40) heated in series with a combustion gas. The reformer (30) and the vaporizer (40) are both of a cross-flow panel configuration that allows for low combustion side pressure drop. Fuel is directly injected into the steam, and during a rapid cold start, both the combustion gas flow rate and the steam to carbon ratio are substantially increased relative to their steady state operating values. A rapid cold start can be achieved in under 30 seconds with a manageable amount of electric power consumption, removing impediments to use in automotive fuel cell applications.

15 Claims, 18 Drawing Sheets

U.S. PATENT DOCUMENTS

| | | | | |
|---|---|---|---|---|
| 4,434,845 A * | 3/1984 | Steeb | | 165/153 |
| 5,180,561 A | 1/1993 | Morishima et al. | | |
| 5,674,301 A | 10/1997 | Sakai et al. | | |
| 6,313,393 B1 * | 11/2001 | Drost | | 136/201 |
| 6,488,838 B1 | 12/2002 | Tonkovich et al. | | |
| 6,969,505 B2 * | 11/2005 | Tonkovich et al. | | 423/659 |
| 6,989,134 B2 * | 1/2006 | Tonkovich et al. | | 422/189 |
| 7,297,324 B2 * | 11/2007 | TeGrotenhuis et al. | | 423/659 |
| 2001/0018140 A1 * | 8/2001 | Hermann et al. | | 429/20 |
| 2001/0049906 A1 * | 12/2001 | Shimazu | | 48/76 |
| 2003/0105172 A1 * | 6/2003 | Bowe et al. | | 518/728 |
| 2004/0031592 A1 * | 2/2004 | Mathias et al. | | 165/104.19 |
| 2004/0142220 A1 * | 7/2004 | Brenner et al. | | 429/19 |

OTHER PUBLICATIONS

Whyatt et al., "Microchannel Steam Reformation of Hydrocarbon Fuels," *Hydrogen, Fuel Cells, and Infrastructure Technologies*, FY 2003 Progress Report.

Whyatt et al., "Progress in Microchannel Steam Reformation of Hydrocarbon Fuels," 2003 Hydrogen and Fuel Cells Merit Review, May 19-21, 2003.

Whyatt et al., (Abstract) "Development of a Rapid Start, On-Board, Automotive Steam Reformer," http//www.aiche.org/conferences/techprogram/paperdetail.asp?PaperID=285&DSN=sprin . . . downloaded Sep. 23, 2005 (presented at AIChE conference on Apr. 27, 2004).

* cited by examiner

RAPID START FUEL REFORMING SYSTEMS AND TECHNIQUES

RELATED APPLICATION DATA

This is a §371 U.S. National Stage of International Application No. PCT/US2004/015402, filed May 17, 2004, which was published in English under PCT Article 21(2), which in turn claims the benefit of commonly owned U.S. Provisional Application No. 60/471,130 filed on May 16, 2003, U.S. Provisional Application No. 60/471,286 filed May 16, 2003, and U.S. Provisional Application No. 60/546,107 filed on Feb. 18, 2004. These applications are incorporated by reference in their entirety.

TECHNICAL FIELD

In one form, the present invention relates to fuel reforming systems for providing a hydrogen rich fuel stream to fuel cells, and more particularly to systems that are capable of rapid start up and efficient operation.

BACKGROUND

Fuel cells are devices that produce energy from the electrochemical reaction of a fuel and an oxidant, and they are considered attractive energy alternatives because of their high efficiency and relatively benign byproducts. Many fuel cells are being designed to use hydrogen as the fuel for the cell, but for many applications, such as use in vehicles or as portable generators, auxiliary power units (APU) or backup power supplies, it is currently impractical to procure and/or store large quantities of the needed hydrogen gas. To address this, systems are being developed to produce hydrogen on demand from more readily available or easily stored sources.

One such approach involves processing or reforming a hydrocarbon fuel into useable hydrogen. The advantages of such an approach are that a hydrocarbon fuel is generally easier to store, and significant distribution infrastructure already exists for several useful hydrocarbons, e.g. gasoline, diesel fuel, natural gas, etc. The major hydrocarbon reforming reactions typically employed require significant amounts of heat and/or elevated reaction temperatures to achieve suitable yields of hydrogen. These high temperatures and/or heat demands present challenges for system start up, such as the amount and rate of energy consumption during start up and the time delay before the fuel cell can begin producing useful energy from the produced hydrogen.

For example, the steam reforming reaction uses steam to oxidize hydrocarbons into carbon monoxide and hydrogen, typically in the presence of a catalyst. Steam reforming is strongly endothermic and is typically performed at high temperature in order to improve the kinetics and to improve equilibrium yield of hydrogen. A fuel processing system based on steam reforming has been developed by the present inventors for automotive applications (See *Progress on the Development of a Microchannel Steam Reformer for Automotive Applications*, G. A. Whyatt et at., 2002 AIChE Spring National Meeting). However this system has required on the order of 20 minutes to start-up from ambient temperatures to an operating temperature of around 650° C. where reasonable rates of steam reforming have been achieved. This hinders commercial practicality and fails to meet the start-up time targets established by the U.S. Department Energy for on-board fuel processors of <1 minute by 2005 and <30 seconds by 2010. Accordingly, improvements are needed, and the present disclosure describes a fuel processing system based on steam reforming that is capable of dramatically reduced start up times.

However, while the present disclosure arose from efforts to reduce the start up time for Applicants' prior automotive steam reforming fuel processing system, it will be understood that the present invention is not so limited. For example, the present invention may be applied in connection with other types of fuel processors having significant heating demands and for a variety of energy production applications. Moreover, certain components and techniques useful in the fuel processors of the present invention are also useful in other fluid processing systems. Examples include a novel mixer for efficiently mixing two fluids and an improved header design for the distribution of a gas stream to a group of microchannels in a microchannel fluid processing device.

SUMMARY

The present invention provides systems and techniques for fuel processing as well as individual fluid processing components and techniques useful in a variety of applications. While the actual nature of the invention covered herein can only be determined with reference to the claims appended hereto, certain aspects of the invention that are characteristic of the embodiments disclosed herein are described briefly as follows.

According to one aspect, a method for operating a fuel cell involves providing a fuel cell system including a fuel reforming reactor and at least one blower for selectively conveying combustion gas through a heating side of the reforming reactor at different mass flow rates; starting-up the reforming reactor by heating a reforming side of the reactor with a combustion gas flowing through the heating side of the reactor; and then operating the reactor to produce a reformate stream by driving an endothermic reforming reaction on the reforming side with heat from a combustion gas flowing through the heating side. In one refinement, the mass flow rate of combustion gas through the heating side during the starting-up is at least about five times a mass flow rate of combustion gas through the heating side during the operating.

Accordingly to another aspect, a method comprises starting up a fuel reformer by heating the endothermic reaction channels of the fuel reformer with hot gas flowing through heating channels at a mass flow rate sufficient to raise the internal temperature of the channels from a starting temperature to an elevated operating temperature in less than about 30 seconds; wherein the starting temperature is less than about 50° C. and the elevated operating temperature is above about 600° C.

According to another aspect, a fuel cell system includes a fuel cell; a steam reformer operable to produce hydrogen for use by the fuel cell from steam and hydrocarbons; and a vaporizer for supplying the steam to the steam reformer; wherein the steam reformer is a panel defining a first face and a second face wherein the length and width of each face is substantially greater than the distance between the faces.

According to another aspect, a fuel cell system includes a fuel cell; a steam reformer for converting a gaseous inlet steam to a reformate outlet stream for use by the fuel cell; a vaporizer for providing superheated steam and having a heating side downstream from a heating side of the steam reformer, and a fuel injector between the vaporizer and the reformer for injecting a liquid fuel into the superheated steam to produce the gaseous inlet stream to the reformer.

Accordingly to another aspect, a system includes a steam reformer having a reforming side and a heating side; a water vaporizer having a vaporizing side upstream from the reforming side of the reformer and a heating side downstream from the heating side of the reformer; and a fuel injector fluidly between the vaporizing side and the reforming side; wherein the fuel injector is configured to atomize a liquid fuel into the superheated stream to produce a gaseous inlet stream to the reforming side during a fuel reforming operation; and wherein at least one of the vaporizer and the steam reformer define an inlet face defining inlets to heating side flow paths and an outlet face defining outlets to the heating side flow paths wherein each of the faces have a length and width substantially greater than the distance between the faces.

According to another aspect, an on-demand fuel reforming system includes a steam reformer having a heating side; a water vaporizer for producing steam for the steam reformer and having a heating side downstream from the heating side of the steam reformer; and a combustion zone for supplying a hot gas to the heating side of the steam reformer; wherein the heating sides of the steam reformer and of the vaporizer each include a multiplicity of flow paths between a pair of faces wherein the length and width of each of the faces is substantially greater than the distance between the faces.

According to another aspect, a fluid processing device includes a stack of thin sheets integrally bonded, the stack including alternating recessed sheets having aligned header openings at opposing ends, wherein the recesses in the sheets define at least a portion of a plurality of first flow paths between the header openings and a plurality of second flow paths distinct from the first flow paths; wherein the smallest dimension of the first flow paths is less than about 0.025 inch; and wherein the aligned header openings are high aspect ratio in shape and form at least a portion of an inlet header and an outlet header to the first flow paths.

According to another aspect, a fluid processing device comprises a stack of thin sheets integrally bonded, the stack including alternating recessed sheets having aligned header openings at opposing ends, wherein the recesses in the sheets define a plurality of first microchannel flow paths between first ones of the header openings and a plurality of second microchannel flow paths between other ones of the header openings; wherein the aligned header openings are high aspect ratio in shape and the cumulative cross sectional area of the flow in an entrance region to one of the first microchannel flow path is within about 50% of the cross sectional area of the flow in the first flow path a substantial distance removed from the entrance region.

According to another aspect, a device for mixing a first fluid stream with a second fluid stream includes a stack of thin sheets integrally bonded, the stack including alternating recessed sheets wherein the recesses in the sheets define at least a portion of a multiplicity of first flow paths for conveying the first fluid to an outlet face of the stack and a multiplicity of second flow paths for conveying the second fluid to the outlet face of the stack, the sheets further including at least one set of aligned header holes for distributing the first fluid to the first flow paths; wherein the first and second flow paths are in thermal contact while in the stack; wherein outlets of the first flow paths are interleaved with outlets of the second flow paths such that the first and second fluids mix upon exiting their respective flow paths.

These and other aspects are discussed below.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part thereof.

FIG. 16a is a plot of the reformate flow rate versus time.

FIG. 16b is a plot of the combustion gas temperature over time at the inlet to the reformer, the outlet of the reformer, and the outlet of the vaporizer.

FIG. 16c is a plot of the reforming side temperatures versus time at the recuperator steam/fuel inlet, the vaporizer steam outlet, the reformer inlet, the reformer outlet, and the recuperator reformate outlet.

FIG. 16d is a plot of the reformate flow rate versus time.

FIG. 16e is a plot of the combustion gas temperature over time at the inlet to the reformer, the outlet of the reformer, and the outlet of the vaporizer.

FIG. 16f is a plot of the reforming side temperatures versus time at the recuperator steam/fuel inlet, the vaporizer steam outlet, the reformer inlet, the reformer outlet, and the recuperator reformate outlet.

DESCRIPTION OF THE ILLUSTRATED EMBODIMENTS

Figure 1:
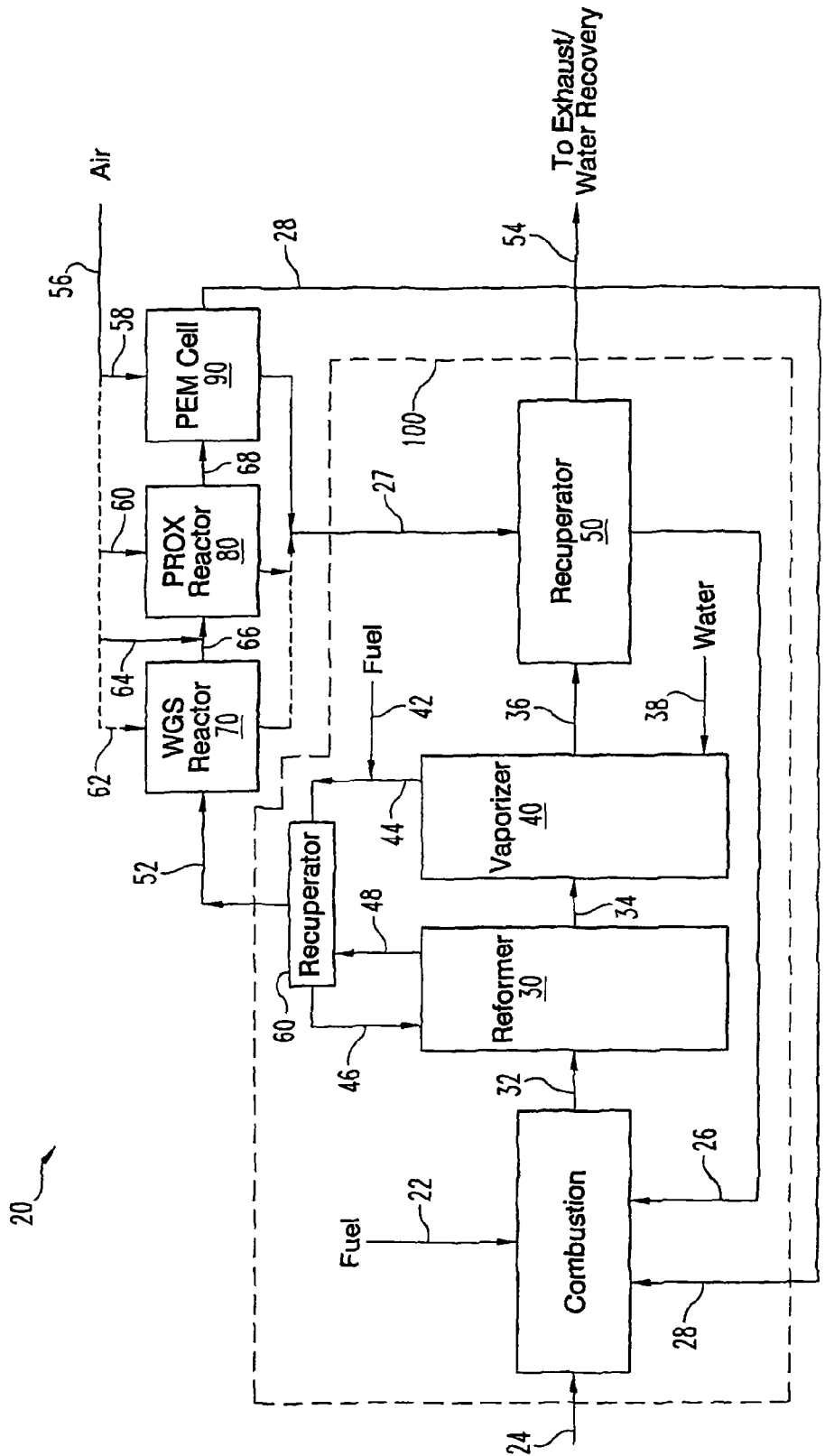
FIG. 1 is a general schematic diagram of a fuel cell system according to one embodiment.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

In one form, the present invention provides a fuel processor comprising a steam reforming reactor and a water vaporizer of a cross-flow panel configuration. They are heated in series with a combustion gas, and during a rapid cold start, the combustion gas flows through the opposing faces of the panels at a substantially elevated flow rate to bring the reformer to operating temperature in under 60 seconds. The panels are designed to have a relative low heating side pressure drop, even during the increased flow of start up, such that the overall power consumption during a rapid cold start can be met with readily available battery power sources. The reforming reactor and water vaporizer can be microchannel components, i.e. those where the flow paths have a characteristic dimension less than 1 mm.

Turning now to FIG. 1, a fuel cell system 20 according to one embodiment of the present invention is depicted. Fuel cell system 20 is based on a so-called PEM (proton exchange membrane) fuel cell 90 [a.k.a SPE (solid polymer electrolyte) fuel cell], which is considered the favored fuel cell for automotive applications. System 20 is configured to produce useful electric energy from a supply of hydrocarbon fuel, air and water, and system 20 includes a fuel reformer 30, a water vaporizer 40, a water gas shift (WGS) reactor 70, a preferential oxidation (PROX) reactor 80, and the PEM fuel cell 90.

A combustion fuel 22 and the anode exhaust 28 from the PEM cell 90 are combusted with air 26 and/or 24, and the resulting hot gas 32 flows through the heating side of the reformer 30. The outlet gas 34 is then sent through the heating side of the vaporizer 40. The remaining heat in gas 36 is captured in a recuperator 50 before the combustion gas is outlet to exhaust 54 for water recovery. Water 38 is fed to the vaporizing side of vaporizer 40, and fuel 42 is mixed into the steam 44 output from the vaporizer 40 which is then heated in the recuperator 60 to produce a gaseous inlet 46 to the reformer 30.

The fuel 42 will typically be a liquid hyrdocarbon and can be added to the steam 44 in any conventional fashion. For example a separate fuel vaporizer can be provided to vaporize the fuel prior to mixing with the steam 44. However, a separate fuel vaporizer is an additional component that would need to be heated during a cold start up. In the illustrated embodiment, no separate fuel vaporizer is employed. Rather, the liquid fuel 42 is directly injected into the steam 44 via a fuel injector or atomizer. In this manner, the beat from the superheated steam 44 serves to vaporize the fuel.

Reformer 30 is a steam reforming reactor having a reforming side that contains a catalyst for reacting the hydrocarbon and steam in the inlet 46 to produce a reformate 48 containing hydrogen and carbon monoxide. Any of a variety of steam reforming catalysts may be used, depending on the type of fuel 42 employed. Methanol-specific catalysts are known for low-temperature conversion with <1% CO in the reformate. Other catalysts are applicable to a wide range of hydrocarbons and produce a gas mixture with near equilibrium CO concentration. To take advantage of the high rates of heat and mass transport achievable a the microchannel steam reformer, a highly active catalysts are preferred. An example of a suitable catalyst and specific techniques for performing steam methane reforming in microchannels is described in U.S. Pat. No. 6,488,838.

The reformate 48 passes through recuperator 60 to recapture some of its heat. The reformate 48 will contain impurities, such as carbon monoxide, that should be removed to protect the PEM cell 90. In system 20, the purification is achieved by passing the reformate 48 along path 52, 66 and 68 through the water gas shift reactor 70 and then, after the addition of air 64 to supply oxygen, to the preferential oxidation reactor 60. Cooling for both the water gas shift and the preferential oxidation reactions is provided with an appropriate cooling fluid, such as air 62 and 60. While a single blower or air source 56 might be employed for all the system air needs, individual blowers to accommodate the varying demands of the reactors 70, 80 and fuel cell 90 might also be employed along the dotted portions of the air supply line 56.

At the PEM fuel cell 230, the purified hydrogen 68 is fed to an anode side where the hydrogen is split to form two hydrogen ions and two electrons. The hydrogen ions travel from the anode to the cathode by passing through a hydrated solid electrolyte that is continuously moistened with water. The electrons pass from the anode to the cathode in external circuit to supply electrical power. At the cathode, the hydrogen ions and electrons are reacted with oxygen in air 58 and the resulting exhaust stream 27, containing water vapor and oxygen depleted air, can be combined with the other air exhausts, heated in recuperator 50, and then fed via 26 to the combustion.

Figure 2:
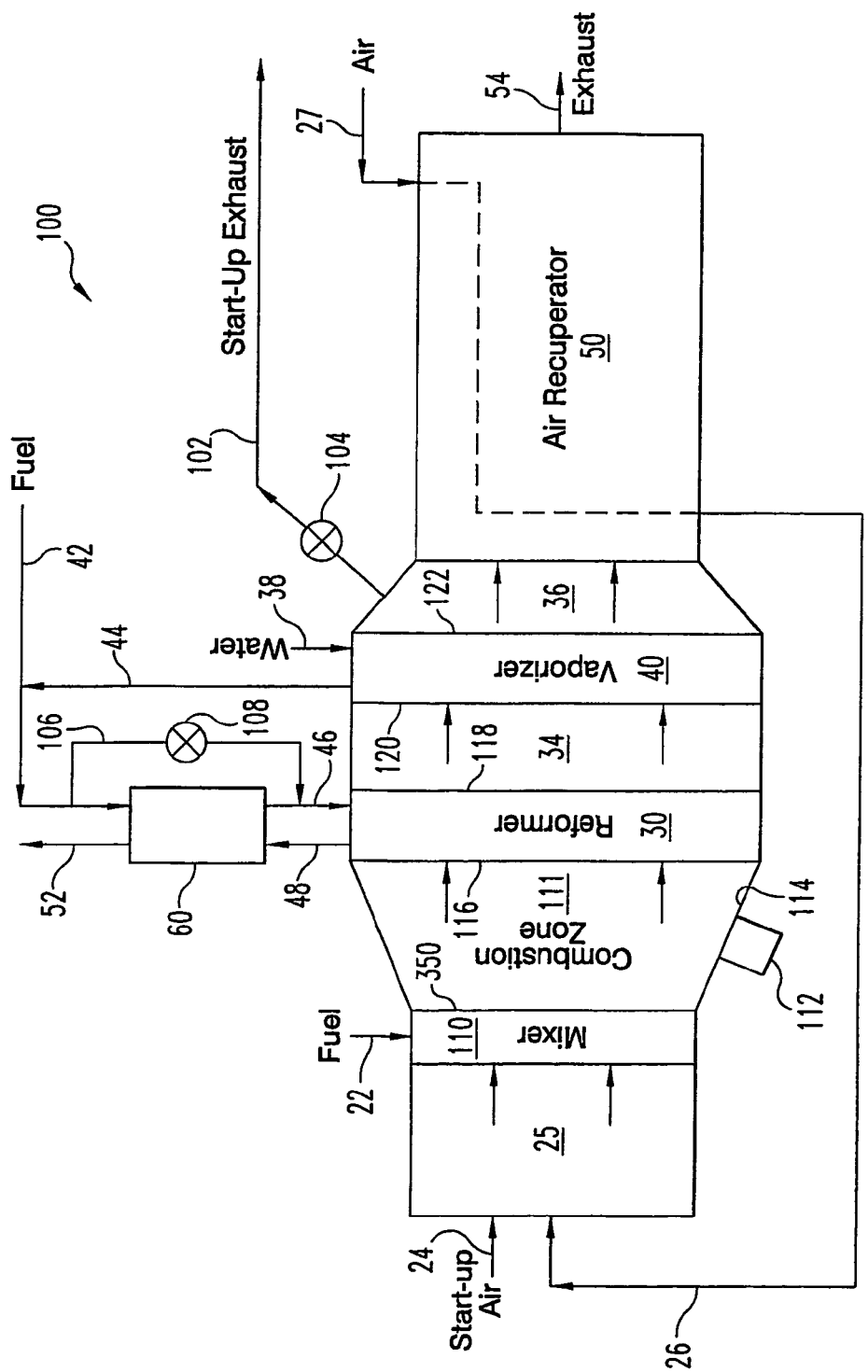
FIG. 2 is a general schematic diagram of the reforming subsystem of the FIG. 1 fuel cell system.

Turning now to FIG. 2, the fuel reforming sub-system 100 of the FIG. 1 fuel cell system 20 is schematically depicted. The fuel reforming subsystem 100 is designed to provide rapid heating of the reformer 30 and vaporizer 40 during start up, and then to meet the more moderate heating demands during operation. As described more fully below, in the illustrated embodiment, the primary mechanism for varying the heating during start up and during operation is varying the flow rate of the combustion gas. An air inlet 25 receives air 26 and auxiliary air 24, as needed (i.e. for start up) and delivers the air through mixer 110 with a suitable blower or blowers (not shown). The mixer 110 also receives fuel 22 and provides a fuel/air mixture into combustion zone 111. The interior surface 114 of combustion zone 111 includes a port to receive spark plug 112, which ignites the fuel/air mixture. The resulting hot combustion gas is directed through the reformer 30 from its heating side inlet face 116 to its heating side outlet face 118, and then through the vaporizer 40 from its inlet face 120 to its outlet face 122. The outlet 36 of the heating side of vaporizer 40 is normally directed through the air recuperator 50 before being exhaust 54, but valve 104 provides access to an auxiliary exhaust 102 that bypasses the recuperator 50. The auxiliary exhaust 102 can be partially or fully employed during start up to reduce or eliminate the additional pressure drop attributable to the combustion gas flow through the recuperator 50.

To reduce corrosion, the combustion zone 111 is preferably constructed such that the interior surface 114 is non-metallic. For example a metallic outer shell may be lined with insulating material up to the point where the interior surface abuts the inlet face 116 of the reformer 111. For laboratory design convenience, system 200 was constructed to use hydrogen gas as the combustion fuel. Mixer 110, described below with respect to FIGS. 10-13, was utilized to efficiently distribute the hydrogen gas into the air to achieve even combustion in chamber 111. In other embodiments, fuel 22 would be the same as the liquid fuel 42, such as gasoline, and an atomizer or fuel injector that injects a liquid fuel (i.e. gasoline) for the spark combustion replaces mixer 110. Catalytic combustion or a combination of spark and catalytic combustion could also be employed to supply the heat to the reformer 30 and vaporizer 40.

Figure 8:
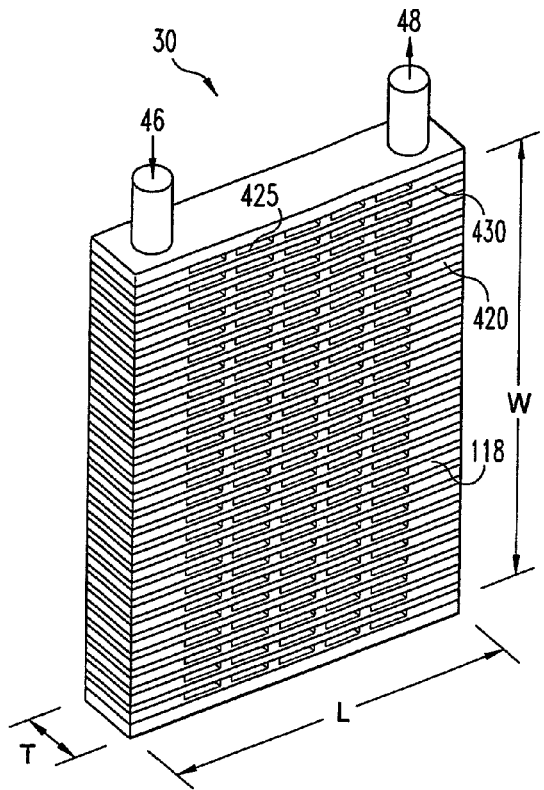
FIG. 8 is a perspective view of the fuel reformer of FIG. 2
Figure 9:
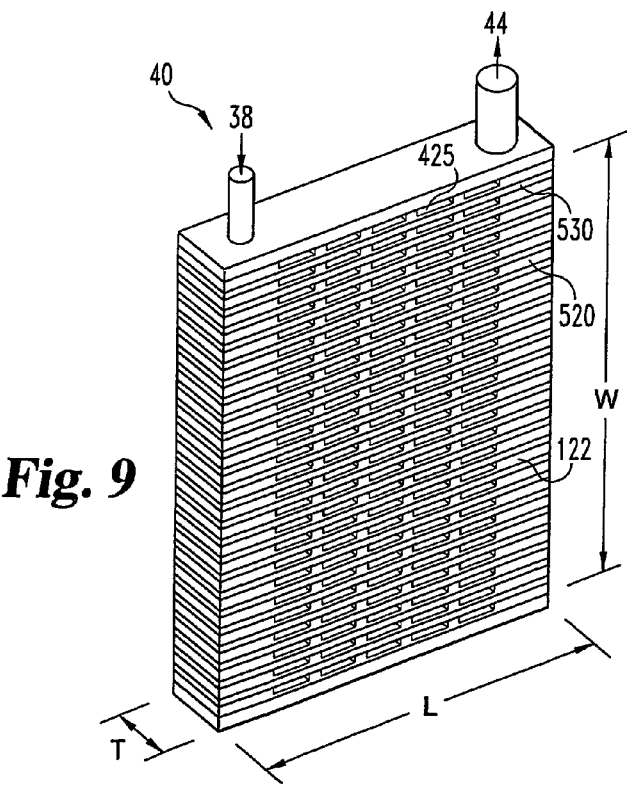
FIG. 9 is a perspective view of the vaporizer of FIG. 2.

In one aspect of the invention, the reformer 30 and vaporizer 40 employed are each of a cross-flow panel configuration, as depicted in FIGS. 8 and 9. More specifically, the heating side is composed of a number of small flow channels 425 between the inlet faces 116, 120 and the outlet faces 118, 122 of the reformer 30 and the vaporizer 40, respectively. The length L and width W of these inlet and outlet faces are each substantially greater than the distance between the faces or the panel thickness T. For example, the length L and width W may be at least 2, 3, or 5 times the panel thickness T.

The reformer 30 and vaporizer 40 may be constructed from a stack of thin sheets integrally bonded wherein recesses in the sheets define at least a portion of the flow paths through the device. For example, as depicted in FIG. 8, the reformer 30 includes an alternating stack of heating side sheets 420 and reforming side sheets 430 sandwiched between a top and bottom plate. The heating side flow channels 425 are formed in the heating side sheet 420. Each of the sheets 420, 430 have header holes (not shown) aligned with the steam/fuel inlet 46 and reformate outlet 48, and the reforming side sheets 430 define reforming flow channels (not shown) between the holes.

Likewise, as depicted in FIG. 9, the vaporizer 40 also includes an alternating stack of heating side sheets 520 and reforming side sheets 530 wherein the heating side flow channels 425 are formed in the heating side sheets 520. Each of the sheets 520, 530 have header holes (not shown) aligned with the water inlet 38 and steam outlet 44, and the vaporizing side sheets 530 define vaporizing flow channels (not shown) between the holes.

To increase the heat transfer efficiency in the reformer 30 (and/or vaporizer 40), either the reforming flow channels (vaporizing flow channels) or the heating flow channels 425, or both, has a smallest dimension in the microchannel range, for example less than about 0.1 inch, or less than 0.5 inch, or less than 0.025 inch. In another aspect, the heating flow channels 425 and/or the reforming (or vaporizing) flow channels are sized such that the Reynolds number (Re) of the flow therethrough is in the range for laminar flow, e.g. below about 2,000. For example, during steady state operation, the combustion gas flow may be at Re of around 100-500, and during rapid start up (described below) the combustion flow may be at Re of around 1000. Additional details for the construction of these and other suitable fluid processing units that may be employed for the reformer 30 and vaporizer 40 are described in commonly owned U.S. application Ser. No. 10/164,969 filed Jun. 6, 2002 and titled Fluid Processing Device and Method (also PCT/US/02/18079), and in commonly owned U.S. application Ser. No. 10/385,831 filed Mar. 11, 2003 and titled Microchannel Reactors with Temperature Control.

In the cross-flow panel configuration of FIGS. 8 and 9, the heating side flow channels 425 are of relatively shorter length through the devices 30, 40 than the vaporizer or reforming flow channels. For example they may be only ¼, ⅛, $1/16^{th}$, or $1/40^{th}$ the length of the vaporizing or reforming flow channels, respectively. Because pressure drop increases with flow path length and with reduction of flow path dimension, this short length allows the pressure drop through the heating sides to be at relatively low level at near atmospheric pressure, providing certain design advantages useful in particular applications.

For example, in system 200, both the start up and the operating heat needs are provided by the combustion gas. In one mode of operation, the rapid heating needed to achieve a rapid cold start up is provided by a significantly increased mass flow rate of the combustion gas, relative to the mass flow rate during steady operation at temperature. In particular forms, this increase in mass flow rate during start up is at least double, at least triple, or at least 5 times the mass flow rate of combustion gas during stead state operation. Increases of 7 to 10 times are also contemplated. A single variable speed blower or a pair of blowers (e.g. a high and low flow blower) can be employed to vary the flow rate in connection with corresponding increases in fuel 22. Optionally, supplemental heating, such as via electric heaters surrounding or embedded in the reformer 30, can be employed during startup.

An additional mechanism for achieving rapid heating of the reformer is to operate with a very high combustion gas temperature, and in certain embodiments, the design of reformer 30 is selected to allow combustion gas temperature to greatly exceed the maximum allowable service temperature of the reformer 30. In the FIG. 2 subsystem, the highest temperatures will be experienced by the reformer at its inlet face 116. Accordingly, there is a limit to the combustion gas temperature at face 116 because the temperature of the reformer's face 116 cannot exceed its maximum allowable service temperature. This is a value that depends on the material employed and refers to is the temperature at which degradation attributable to creep and/or corrosion would be noticeable after about 1000 hours of continuous operation. In the examples described below, because the reformer was constructed of 316L stainless steel, the max service temperature was about 650° C. Nonetheless, the reformer 30 was able to tolerate a combustion gas inlet temperature at face 116 of around 1000° C. without significant degradation in short term tests, meaning that despite being subjected to temperatures of 1000° C., the inlet face 116 of the reformer 30 did not approach 1000° C. Fabrication of the reformer out of materials having substantially higher maximum operating temperatures, such as an Inconel alloy, is also contemplated.

One reason the gas temperature at the inlet face 116 can greatly exceed the maximum service temperature of the reformer at its inlet face 116 is because of the superior heat transfer efficiency into the reforming side. Another reason is because of heat conduction through the panel (i.e. from face 116 to face 118). When the panel thickness T is relatively small, this face-to-face heat conduction through the panel significantly reduces temperature differences between the reformer's inlet and outlet faces 116, 118. Accordingly, in certain aspects of the invention, the reformer operates (at least during start up) with a combustion gas inlet temperature at least 100° C. greater than a maximum allowable service temperature of the reformers 30. In other aspects this it is at least 200° C. or 300° C. greater.

While there is a great variety of air moving equipment available, the costs (and weight) generally increase with the achievable pressure drop. At the low end, a variety of inexpensive fans and centrifugal blowers are capable of providing air at less than 5 inches of water, more commonly at less than 3 inches. Slightly more expensive models such as radial blowers are generally capable of 8 to 12 inches of water. Considerably more expensive regenerative blowers are capable of around 140 inches of water or 5 psi, and finally the most expensive, largest, and heaviest option is positive displacement compressors and blowers, such as rotary lobe, sliding vane and reciprocating piston compressors that generate pressures up to 100 psi or more. Designing the fuel processor 100 to have a relatively low combustion side pressure drop allows use of low cost and lightweight equipment, which can have significant advantages in portable applications.

Furthermore, the air horsepower exiting a fan as well as the power requirement of the fan motor is directly proportional to the fluid flow rate and to the pressure increase provided. Thus, providing a given air flow at 4 inches of water requires only 3% of the power as the same flow provided at 5 psi (138 inches of water). In an automotive application, for example, the power needed for air movement during start up would need to be supplied by an alternative energy source, such as batteries carried by the vehicle. The more power needed, the larger, and heavier, the batteries must be. Conversely, the lower the quantity of power consumed to drive the combustion gas during start up, the less battery power that is needed during start up. For example, it is expected that a system 100 sized to provide the reformate for a 50 kWe PEM fuel cell could utilize start up air flow rates of around 600 scfm at near atmospheric pressure. For a 75% efficient blower operating at 10 inches of water, this would require about 931 Watts, which is a power level reachable by a conventional lead-acid automotive battery.

It is to be understood that the present steam reforming system can be implement in a variety of designs, and while certain designs may achieve certain advantages described herein, not all designs will achieve all advantages. Nonetheless, it is to be understood that one aspect of the invention is to have the steam reforming system 100 configured such that the air flow energy demand during start up is an amount less than about 8% of the steady state electrical output of the fuel cell, or less than 4% or less than 2%. An additional or other aspect is to configure the system 100 such that the pressure drop through the heating side of the reformer and vaporizer during start up is substantially less than 1 psi, for example less than about 10 inches of water across each unit. In other forms the pressure drop through each unit is less than 8 inches water each, or less than 4 inches water each. A still additional or other aspect is to configure the system 100 such that the start up time from ambient to operating temperature (e.g. from below 50° to above 600° C.) is less than about 60 seconds, preferable less than 30 seconds, and more preferably less than about 15 seconds.

Control variables during start up of the fuel processing system 100 include the relative amount of fuel 42 and water 38 fed to the vaporizer, or equivalently the choice of steam to carbon ratio (S:C) in the inlet 46 to the reformer 30. In one aspect of the invention, this S:C ratio is substantially greater than the S:C ratio employed during steady state operation of the system 100, for example 4, 6, or 8 times greater. This increased S:C ratio serves a variety of purposes. First, the high rate of steam would deliver heat to downstream hydrogen purification components, such as the WGS reactor 70 and PROX reactor 80 of FIG. 1 (or the membrane separator 210 of FIG. 3, discussed below.) This can be used to bring them up to operating temperature or to reduce their start up time if used in connection with another heating source.

Figure 17:
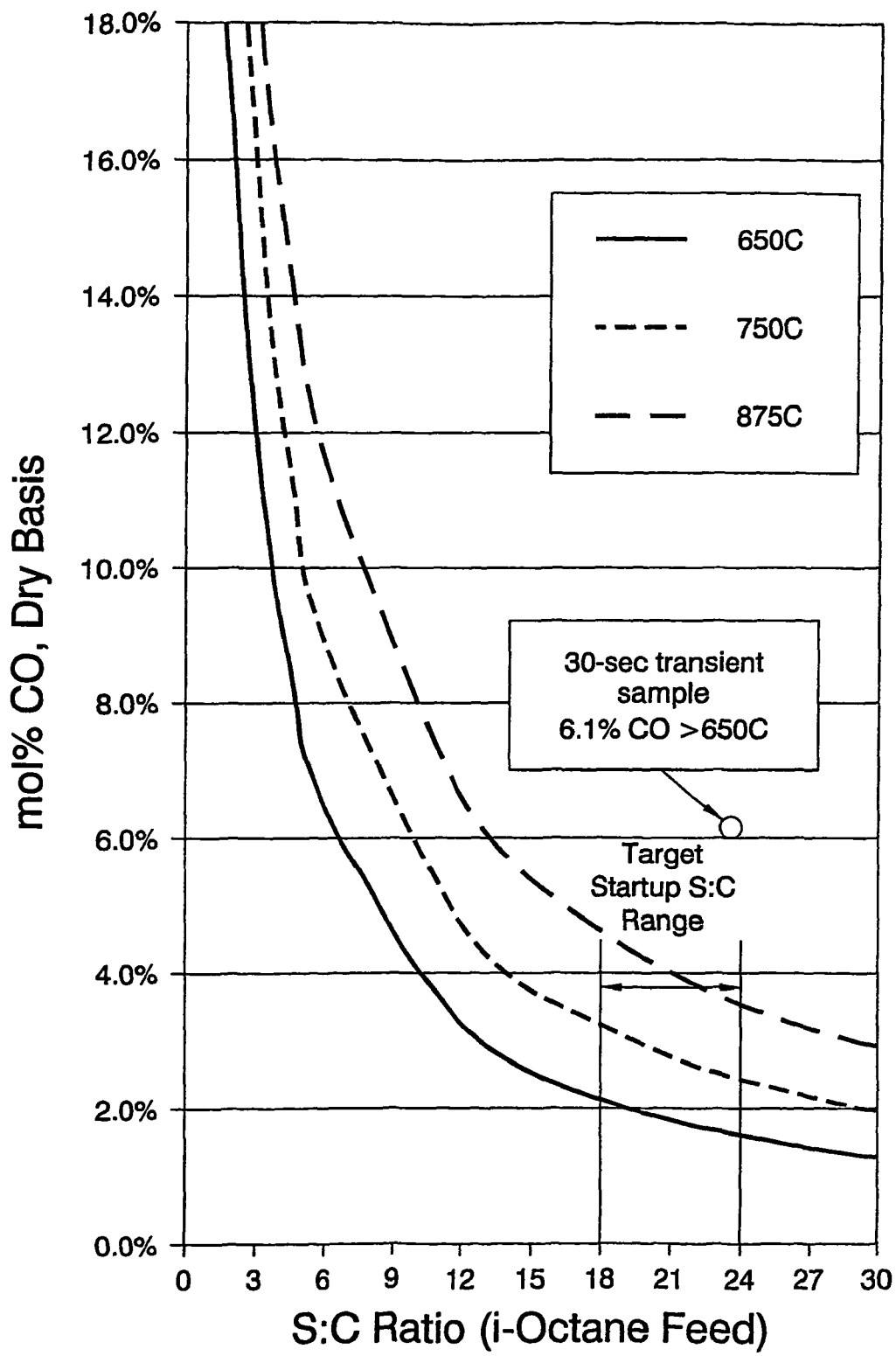
FIG. 17 is a plot of equilibrium CO concentration versus steam to carbon ratio for steam reformation of an isooctane feed at various temperatures, with the start up S:C ratio targets indicated as well as the measured concentration after rapid start as described in the examples.

Another purpose of the high S:C ratio during start up is to reduce CO concentration in the reformer output 48. For example, FIG. 17 shows the relationship between equilibrium CO content and S:C ratio for various temperatures for steam reformation of an isooctane feed. The targeted S:C ratio of between 18-24 is selected to reduce the CO content in the reformate to <4%. While the WGS reactor (or other purification equipment) is being brought to temperature, it is unable to convert large quantities of CO to purify the reformate. Thus, reducing the CO content of the reformate 48 reduce the demand for high WGS activity while it is coming to temperature.

It is to be understood that, in many applications, each of the control variables, including the S:C ratio, the fuel feed rate and the blower(s) speed would be controlled by a start-up controller (not shown). The controller can comprise hardware (e.g. a computer) and logic (e.g. software) for analyzing the operation condition of the system. This controller can receive appropriate inputs from input sensors throughout the system, for example temperature sensors along the combustion gas stream and in the reformate 48, and the logic would determine when to transition from start up S:C ratios and combustion gas flow rates to the steady state parameters.

Figure 3:
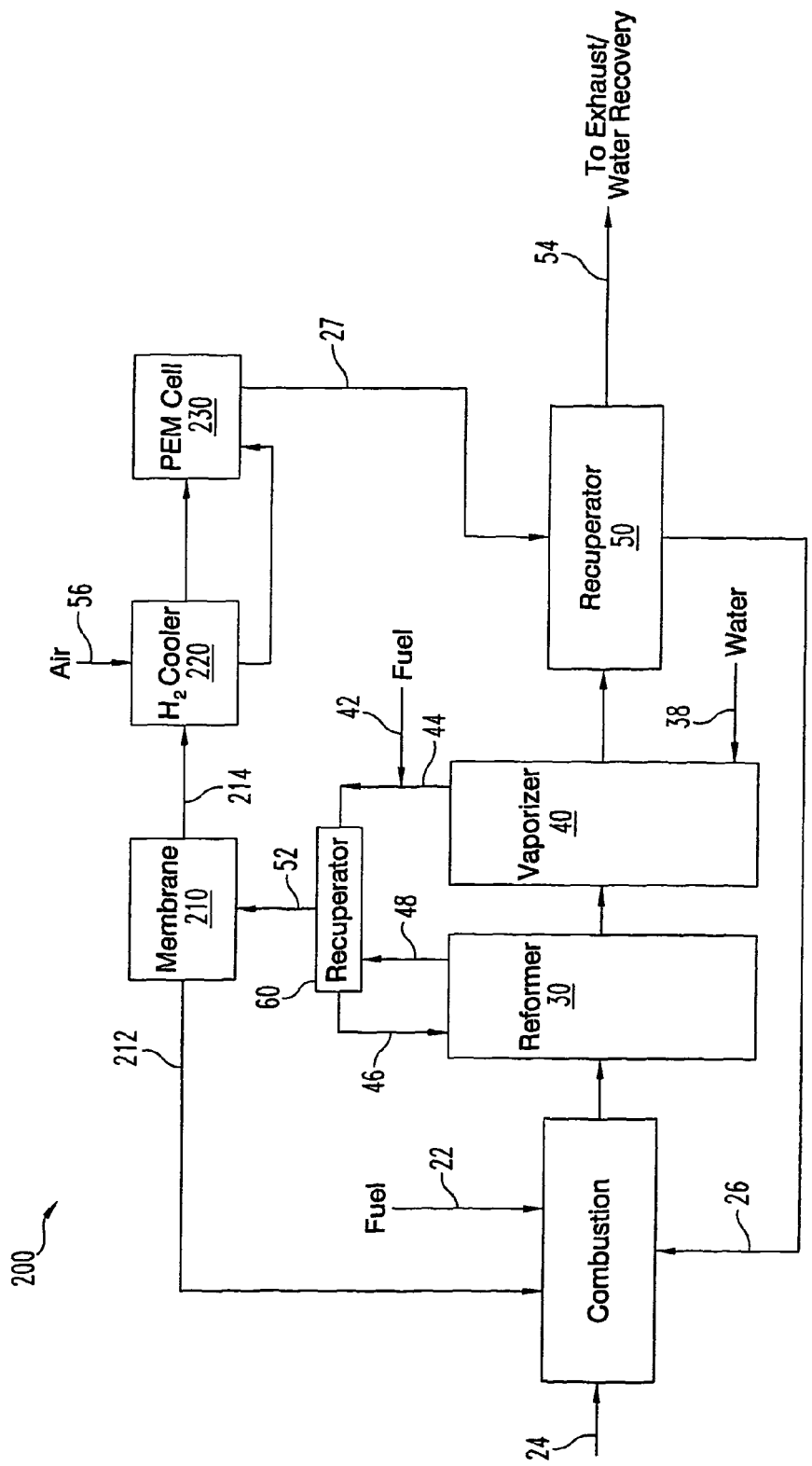
FIG. 3 is a general schematic diagram of a fuel cell system according to another embodiment.

It is to be understood that the steam reforming subsystem 100 can be adapted to a variety of fuel cell environments. For example, fuel cell system 200 according to another embodiment is depicted in FIG. 3. Fuel cell system 200 functions the same as system 20 of FIG. 1 save that system 200 employs a hydrogen membrane separator 210 to purify the reformate 52. The membrane is typically a film or material that selectively allows hydrogen to pass through. The inlet side of the membrane, called the retentate side is typically at a higher pressure than the outlet side, called the permeate side. The pressure difference between the permeate side and the retentate side helps to drive the separation of the hydrogen. Suitable membranes include for example thin tubes or foils of palladium and alloys of palladium with silver or copper. The purified hydrogen stream 214 leaving the membrane 210, termed the hydrogen permeate, is fed to the fuel cell 230 after being cooled by air stream 56 in cooler 220. The material that did not pass through the membrane or retentate 212 may be recycled for combustion to provide process heat.

Figure 4:
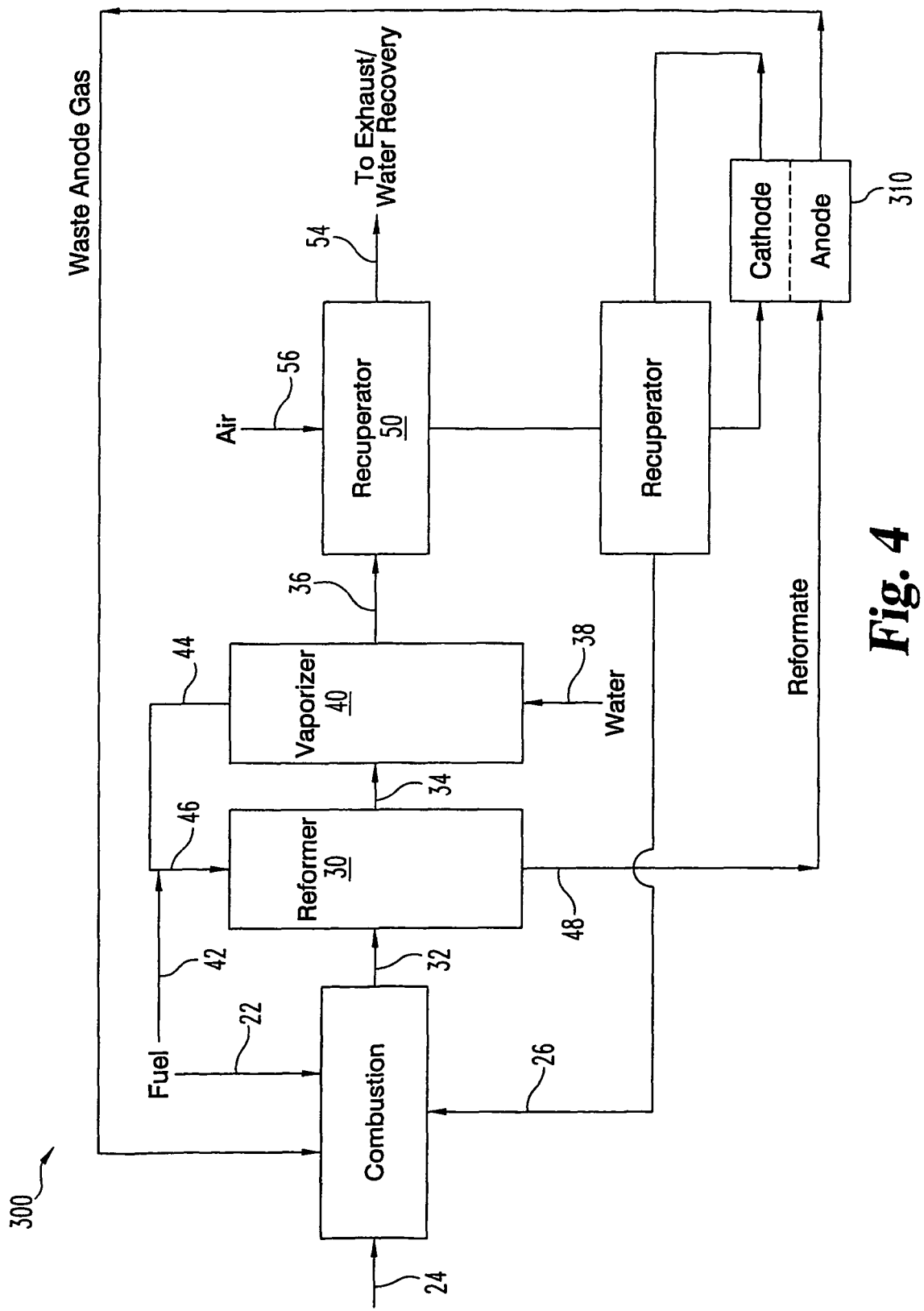
FIG. 4 is a general schematic diagram of a fuel cell system according to a still further embodiment.

In still other embodiments, a different type of fuel cell, such as an alkaline fuel cells, phosphoric acid fuel cells, or molten carbonate fuel cells. For example, FIG. 4 illustrates a system 300 employing a solid oxide fuel cell 310.

Figure 5:
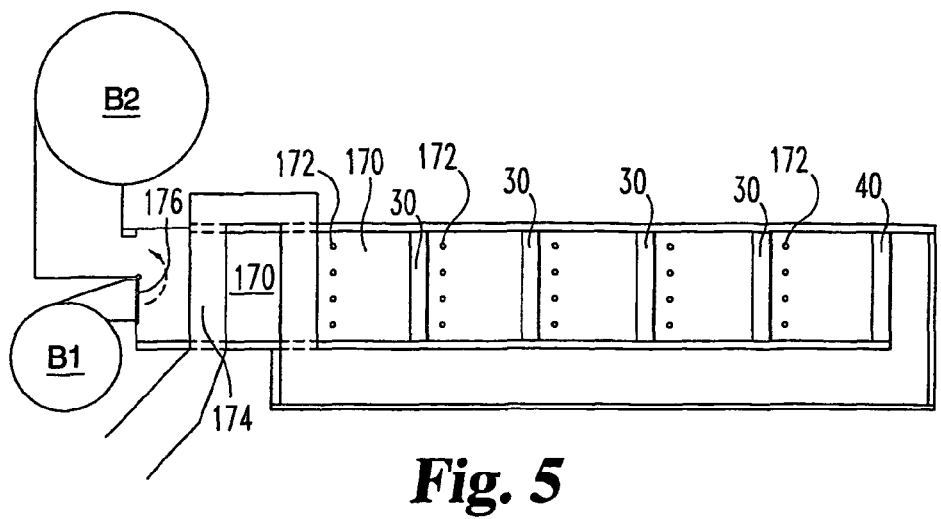
FIG. 5 is a general schematic diagram of an arrangement for heating fuel a number of reformers and a vaporizer in series flow.

While the fuel reforming described so far has utilized only a single fuel reformer 30, applications are contemplated where a number of individual fuel reformers are used. FIG. 5 schematically depicts one arrangement for operating a group of fuel reformers 30 in series with a single vaporizer 40. Air is supplied along the heating path 170 by either the large capacity B2 or the small capacity blower B1 depending on the position of damper 176. When positioned for rapid start up as depicted in FIG. 5, the large capacity blower drives the air down path 170 and through the series of panel-type reformers 30. A series of fuel injection ports 172 are upstream from each reformer 30 and the vaporizer 40. These ports 172 supply the fuel that is then catalytically or spark combusted in front of each panel to heat the respective reformer 30. Temperatures along the heating path 170 can be measured and the amount of fuel supplied to each set of injectors 172 controlled to assure even heating of all the reformers 30. After passing through the vaporizer 40, the combustion gas follows return path 174 to exchange heat with the air upstream from the first reformer 30 in the series.

Figure 6:
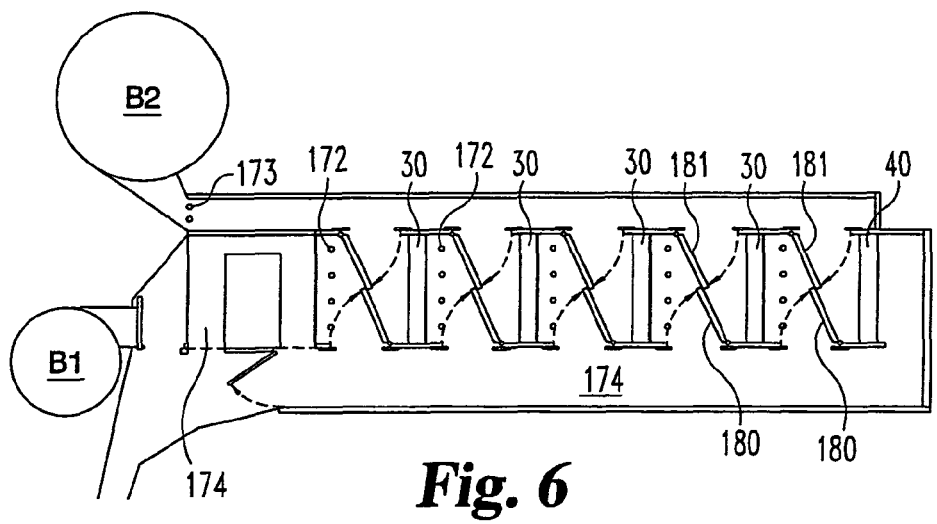
FIG. 6 is a general schematic diagram of an arrangement for heating a number of fuel reformers and a vaporizer in either series or parallel flow, shown in the parallel flow operation.
Figure 7:
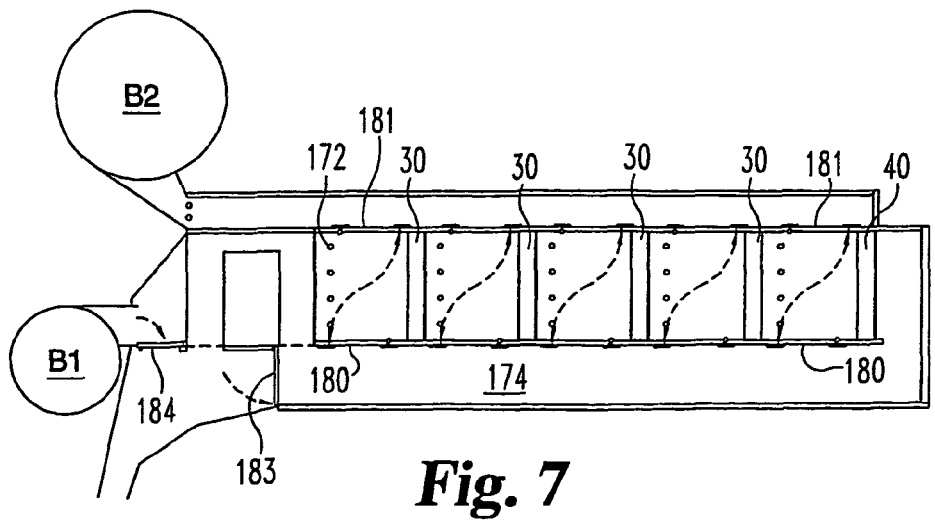
FIG. 7 is a general schematic diagram showing the arrangement of FIG. 6 in series flow operation.

FIGS. 6 and 7 depict a group of reformers 30 and a vaporizer configured to operate in series flow during normal operation but in parallel flow during start up. As depicted in FIG. 6, during start up the large capacity blower B2 is active and fuel is being supplied through a single set of ports 173. The resulting combustion gas then travels in parallel flow through the reformers 30 and the vaporizer 40. After startup, a series of dampers 180, 181 and 183, 184 are operated to place the reformers 30 into series flow downstream from the smaller capacity blower B 1, and the fuel is supplied via injectors 172 as described with respect to FIG. 5 above.

Figure 10:
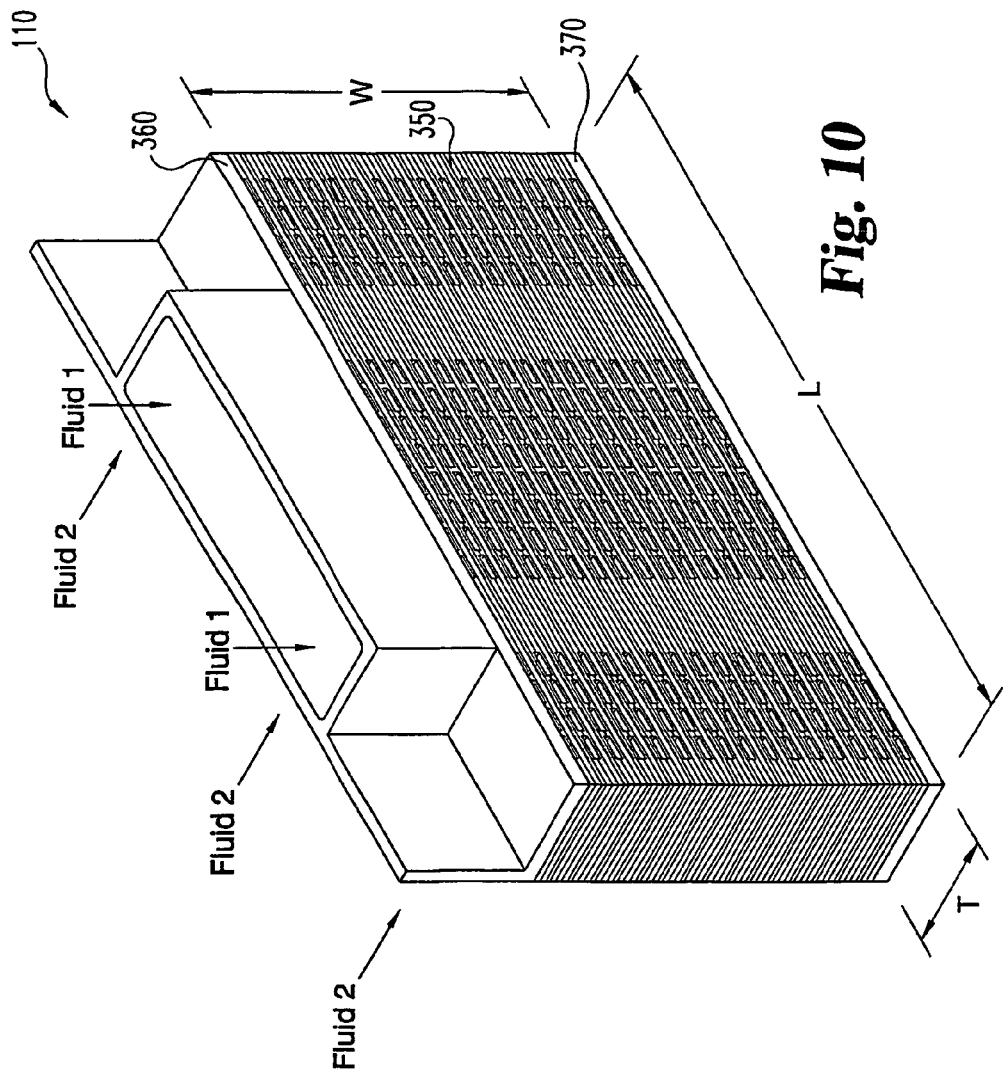
FIG. 10 is a perspective view of the mixer if FIG. 2.
Figure 10A:
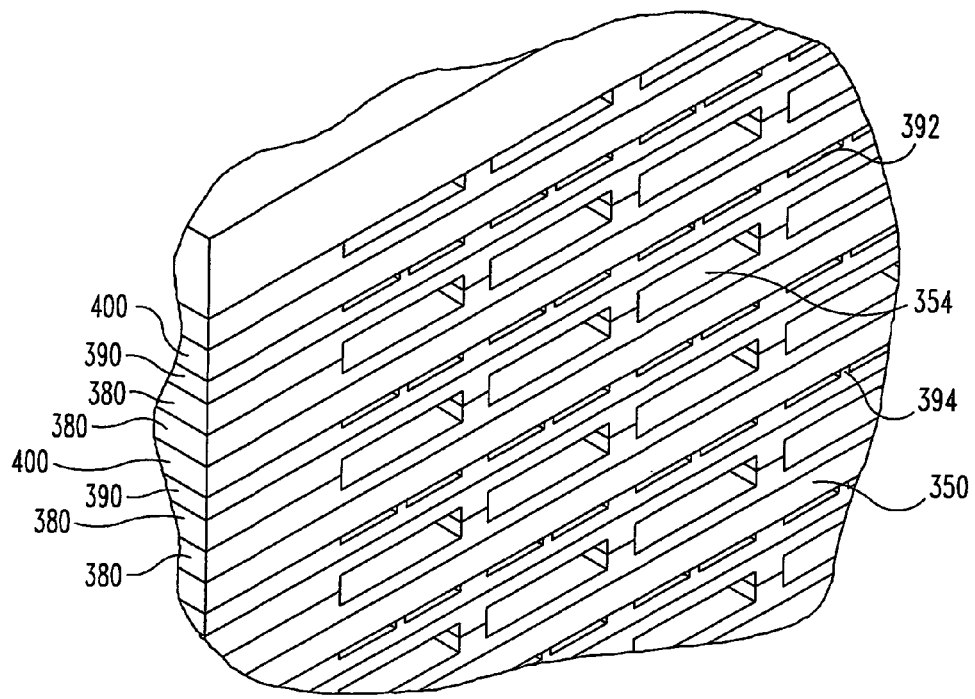
FIG. 10a is a partial enlargement of FIG. 10 showing details of the front face.
Figure 11:
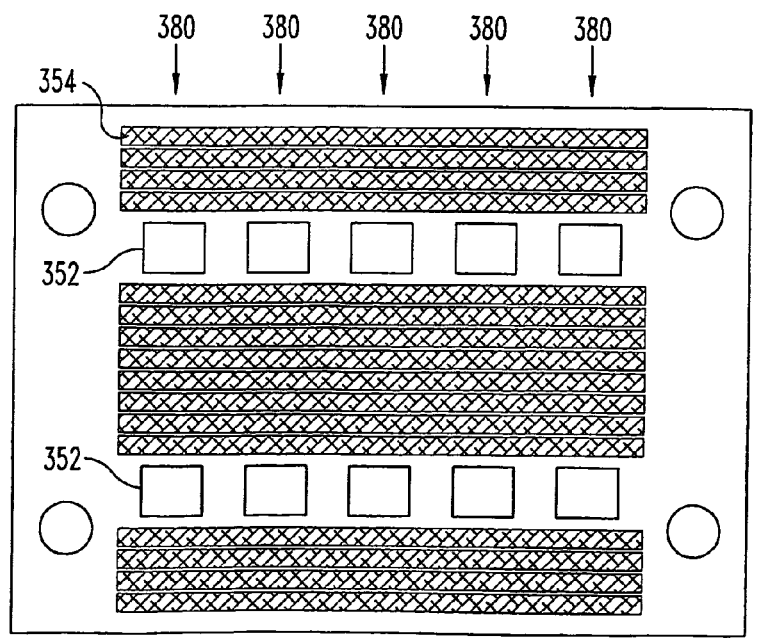
FIG. 11 is a plan view of a sheet used to create the fluid 2 flow channels for the FIG. 10 mixer.
Figure 12:
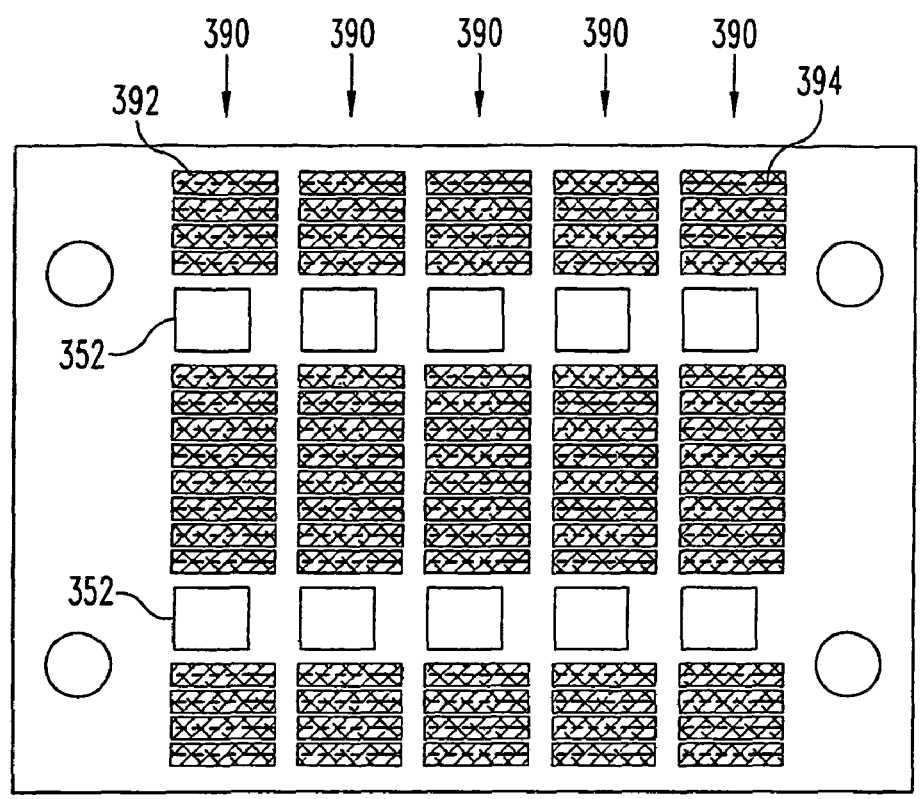
FIG. 12 is a plan view of a sheet used to create the fluid 1 flow channels for the FIG. 10 mixer.
Figure 13A:
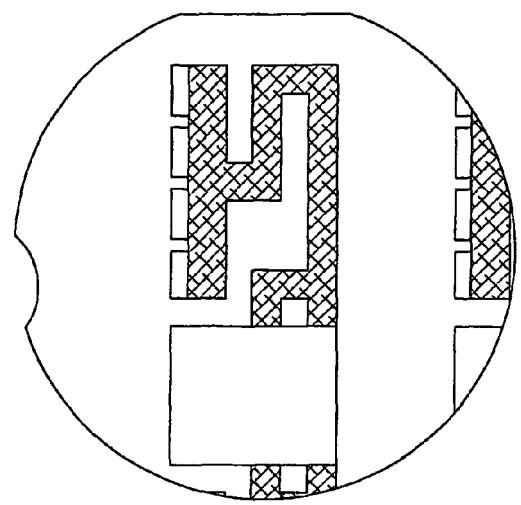
FIG. 13 is a plan view of the sheet used to create the distribution channels from the fluid 1 inlet headers to the fluid 1 flow channels for the FIG. 10 mixer.
Figure 13:
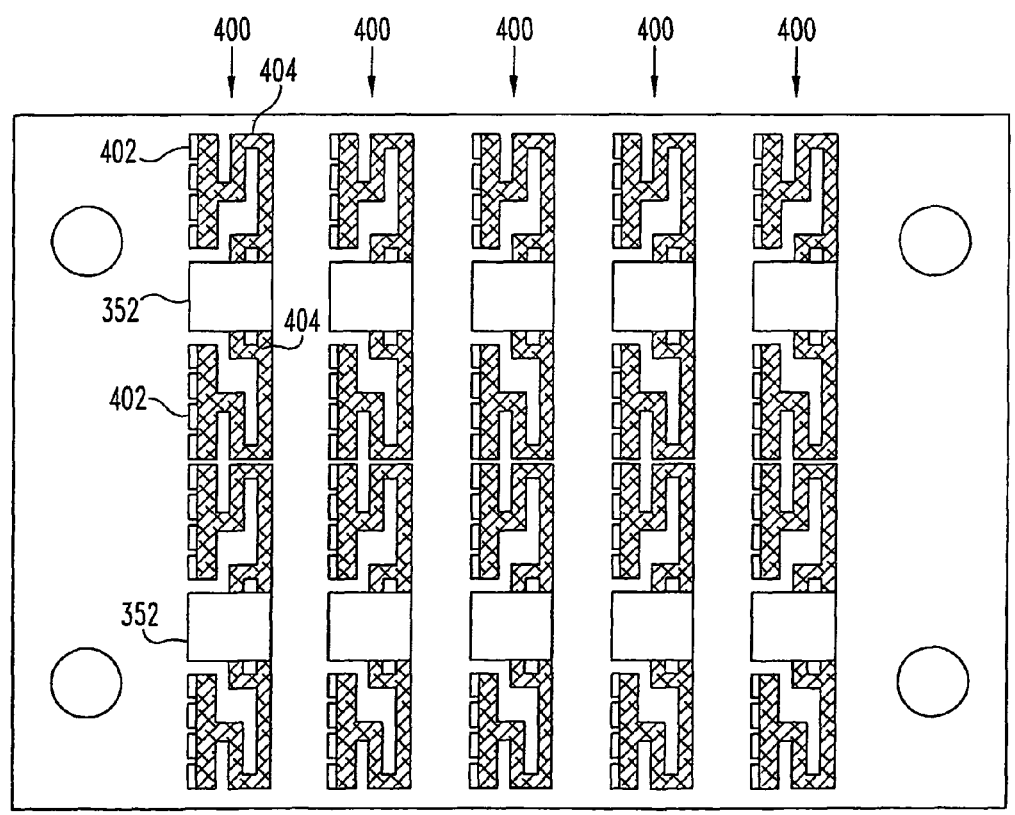

Turning now to FIGS. 10-13, additional features of the mixer 110 are depicted. As described above, the mixer 110 was employed in the laboratory version of FIG. 2 to efficiently mix hydrogen gas into air prior to combustion. More generally, however, mixer 110 may be used in any fluid processing environment where two fluids need to be efficiently mixed. Mixer 110 is of a panel configuration and is constructed from a stack of thin sheets integrally bonded as described above with respect to the vaporizer 40 and reformer 30. FIGS. 11-13 depict the individual sheets 380, 390, 400, where cross hatching is used to indicate recesses (formed by etching). As described more fully in U.S. application Ser. No. 10/164,969, the sheets for a number of identical mixers 110, in this case 5, are presented side by side on a single shim to facilitate the bonding process and would be separated after bonding. The bonding can be diffusion bonding, and the left and right margins of each shim have holes which align with an external ram for applying pressure during the diffusion bonding. The sheets are stacked as indicated in FIG. 10A, and each sheet has a pair of header holes 352 that align in the stack to form the first fluid header.

The second fluid channels 354 have inlets at the rear face (not shown) and outlets at the mixing face 350, and are constructed from a pair of facing sheets 380. The inlets to the first fluid flow channels 392 are internal to the mixer 110 and the outlets are interleaved with the outlets of the first fluid channels 354 on mixing face 350. In the illustrated embodiment, the first fluid channels 392 are constructed to be substantially shallower than the second fluid channels 354 and they include a support rib 394 at their outlet on the mixing face 350. In one form, the first fluid flow channels 392 are about ¼ the full height of the second fluid flow channels 392.

In operation, the first fluid enters the top of the mixer 110 (per the FIG. 10 view) and passes into the tortuous channel 404 of the internal distribution sheet 400 (FIG. 13). The tortuous channels 404 convey the first fluid toward the rear face to the holes 402 just inside the rear face of the mixer 110. The first fluid drops through the holes 402 in sheet 400 into the first fluid flow channels 392 and then flows the length of the channels 392 to the outlet at the mixing face 350. The interleaved outlets of the different fluid channels on the mixing face 350 serves to efficiently mix the fluid. Also, paths 392 and 354 are in thermal contact through the device, which reduces temperature gradients that would otherwise lead to mal-distribution.

The flow channels are of microchannel scale such that the flow of both fluid is laminar, and the shims are designed such that a major portion of the heat transfer occurs between channels 354 and 392, which are in co-current flow. Because heat transfer in microchannels is directly related to the height of the channels, with a smaller height leading to increased heat transfer coefficient, this may be accomplished by designing the channels 392 to be smaller in height than the distribution channels 404. This also serves to concentrate the pressure drop for fluid 1 in the channels 392, further contributing to uniform distribution.

It is to be understood that the mixer 110 can be applied in a variety of applications, and essentially anytime it is necessary to achieve a uniform controlled mixing of two fluids. One application is mixing two fluids prior to combustion (either catalytic or flame combustion). It is believed that by providing a uniform mixture of fuel into the air, the heat generation on the catalyst will be highly uniform, preventing local temperature variations on the catalyst that can degrade the catalyst or decrease its performance.

Another example is mixing steam and vaporized fuel prior to a steam reformer. Prior to introducing reactants into a steam reformer it is necessary to have a uniform mixture of steam and fuel, and locally low steam ratios lead to coking. Uniform mixing reduces this risk and could save energy due to reduce need to generate steam.

Another example is mixing prior to introduction of gases into a reciprocating piston engine. In some applications the introduction of a gaseous additive to the incoming air to a piston engine is considered, primarily for NOx reduction. This added gas could be hydrogen or reformate from a reformer or exhaust gas being recirculated back to the engine. In the case of the diesel engine, this device would provide a uniform mixture of incoming air and recirculated exhaust gas. This would have the benefit of making a greater extent of exhaust gas recirculation tolerable (ability to operate closer to stoichiometric air) before adverse effects occur in the areas of soot production and engine power output.

Another application is humidification of an elevated temperature gas stream. If it is desired to add steam to a hot flowing gas stream the steam can be added as fluid 1 into the flowing stream 2. In this application, the temperature should be such that condensation within the device is avoided as this may upset the uniform flow conditions.

Another application is reducing mixing time for fluids. In some applications the mixing time of two reactants can affect the extent of unwanted side reactions. Rapid mixing of reactants can maximize yield of the desired product. This is usually achieved using a high shear mixer. By feeding reactants to such a process through this mixing device 110 the time to achieve the desired mixture can be minimized. For difficult to mix fluids the device can be used in conjunction with a mechanical mixer to achieve a fully uniform mixture in a shorter length of time. This could reduce the time and energy cost associated with mixing intensive processes as well as increase productivity of processes where output is related to mixing time for fluids.

Figure 14:
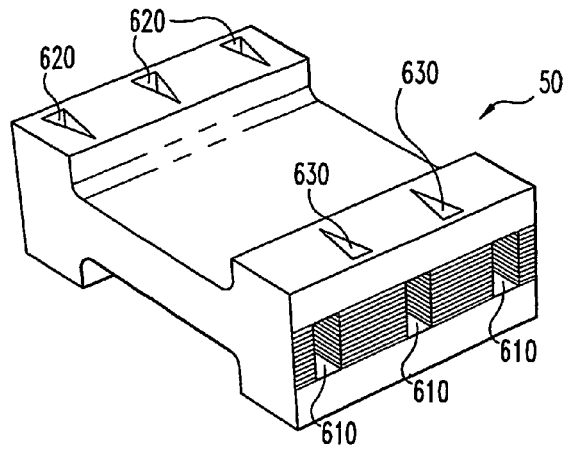
FIG. 14 is a perspective view of the air/air recuperator of FIG. 2.
Figure 15:
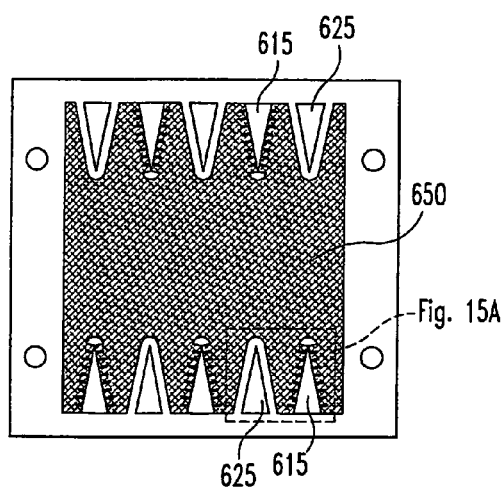
FIG. 15 is the sheet used to create the FIG. 14 recuperator.
Figure 15A:
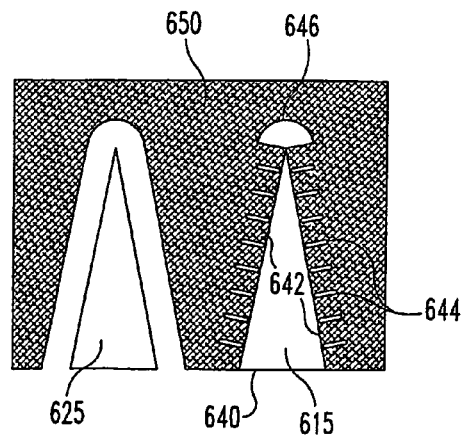
FIG. 15a is a partial enlargement of FIG. 15 showing two adjacent header holes.

Referring now to FIGS. 14, 15 and 15A, additional features of the recuperator 50 of FIG. 2 are depicted. Recuperator is constructed as a stack of thin sheets as described above, but only uses a single shim (FIG. 15). The etched side of the shim is assembled facing the etched side of the next shim with like-headers facing each other. Such a shim pair defines a single flow path 650 open to the header holes 615. This flow path 650 functions as either the first fluid flow path or the second fluid flow path depending on whether the shim pair is oriented in the stack with the bottom shim as depicted in FIG. 15 or rotated 180° (with etched side remaining up). It is to be understood that when the shim is rotated 180°, all the header holes 615, 625 align, such that the set of header holes 615 that are open to the flow path 650 are aligned with the headers holes 625 that are closed to the flow path 650 in the adjacent layers of the stack.

Accordingly, FIG. 14 illustrates a device constructed with an alternating stack of the FIG. 15 shim pair. A manifold has been added to create the inlets 620 and outlets 630 for the first fluid, and portions have been cutaway from the base 640 of the other set of header holes to create the inlets 610 and outlets (not shown) for the second fluid. Because there are an odd number of holes 615, 625 on each side of the shim, (in this case 5 per side) there are three first fluid inlets 620 and two first fluid outlets 630 (or vice versa). Likewise, there are three second fluid inlets 610 and only two outlets (not shown) in a counter flow heat exchanger configuration.

As depicted in FIG. 15A, the header holes 625 and 615 are high aspect ratio structures. More specifically, they are triangular with a height at least 2 times the length of the base 640.

The holes 615 have their two longer sides 642 serving as the entrance for the respective fluid to the flow channel 650, and the relatively short base 640 is disposed relatively away from the flow channel 650. A plurality of support ribs 644 span the opening to the flow path 650, and a support structure 646 is at the apex of the triangle. The ribs 644 and structure 646 bond with the underside of the adjacent shim during the diffusion bonding construction of the stack and assure sealing of the header hole from the flow on alternating layers.

This use of a high aspect ratio header holes serves to increase the cross sectional area at the inlet (and outlet) region of the flow path 650 (i.e. the portion of flow path 650 adjacent the edges 642 and between the support ribs 644). The objective is to more closely match the cumulative cross sectional area for fluid flow over these inlet (or outlet) regions (i.e. for each of the headers 615) to the cross sectional area for the fluid flow nearer the center of the flow path 650 (i.e. away from the inlet region of the flow path 650). Matching the cross sectional areas in turn causes the fluid velocities to match, reducing the entrance and exit losses for the overall flow through the channel 650. It may not be practical to exactly match these cross sectional areas. In one form, the headers are designed such that cumulative cross sectional area of the flow in the entrance (or exit) region to the microchannels is within about 50% of the cross sectional area of the flow in the microchannel a substantial distance removed from the entrance (or exit) region. More preferably it is within about 30%, 20% or 10%.

For example, prior designs for a counter current microchannel air-air recuperator employed square header holes where only one side of the square was open to the flow path. As a result, the velocity in the entrance and exit regions was more than twice the velocity in the middle of the flow path heat exchange region. Reducing the velocity changes upon entrance and exit of the flow paths 650 serves to reduce the pressure drop. For example, the illustrated laminar flow heat exchanger is capable of greater than 80% effectiveness between two equi-molar flows of air at 1 atm pressure where the pressure drop in each air stream is less than about 2.5 inches of water. More generally, these header holes can be used in any microchannel device where the pressure losses into and out of the microchannels is a concern.

Reference will now be made to specific examples illustrating certain particular features of inventive embodiments. It is to be understood, however, that these examples are provided for illustration and that no limitation to the scope of the invention is intended thereby.

EXAMPLES

A fuel processor was constructed according to FIG. 2. The reformer 30 was constructed from a stack of 316L stainless steel shims. Each reforming-side flow path in the stack was constructed from three shims. A center spacer which provides the gap needed for the catalyst felt was sandwiched between facing etched shims which have support ribs to hold the felt and to define the reactant flow paths past the felt. A similar three shim technique for forming reactant flow paths is described more fully in commonly owned U.S. application Ser. No. 10/385,831 filed Mar. 11, 2003. The catalyst felt was added to the stack after diffusion bonding by cutting access slits in the edges of the panel, sliding the felt longitudinally between the faces and into the spacer shims, and then resealing the edge with a piece of metal. The combustion side was formed from a pair of facing shims to create a 0.02 inch deep combustion flow channel. 48 sets of these shims were stacked to form a reactor with a core shim stack measuring 3.6 inches high, 2 inches wide, and 0.45 inches thick. Internal headers are included on either side of the reactor which increases the width to 2.5 inches.

The vaporizer 40 was also constructed from a stack of 316L stainless steel shims. A pair of facing etched shims provided the steam/water flow paths and a pair of facing etched shims provided the combustion flow paths, as described more fully in U.S. application Ser. No. 10/164,969 filed Jun. 6, 2002. On the vaporizing side, the water channel was etched 0.005 inches deep and the steam channel had a combined etch depth of 0.01 inches. The combustion side had channels with a combined etch depth of 0.01 inches. The vaporizer was constructed of 28 steam/water layers interleaved with 29 combustion gas layers. After bonding and with the top and bottom plate installed, the vaporizer was about 5.25 inches long, 3 inches wide, and 0.185 inches thick.

The fuel 42 was isooctane, and was chosen to simulate gasoline. For laboratory convenience, the combustion fuel 22 was hydrogen gas.

Figure 16A:
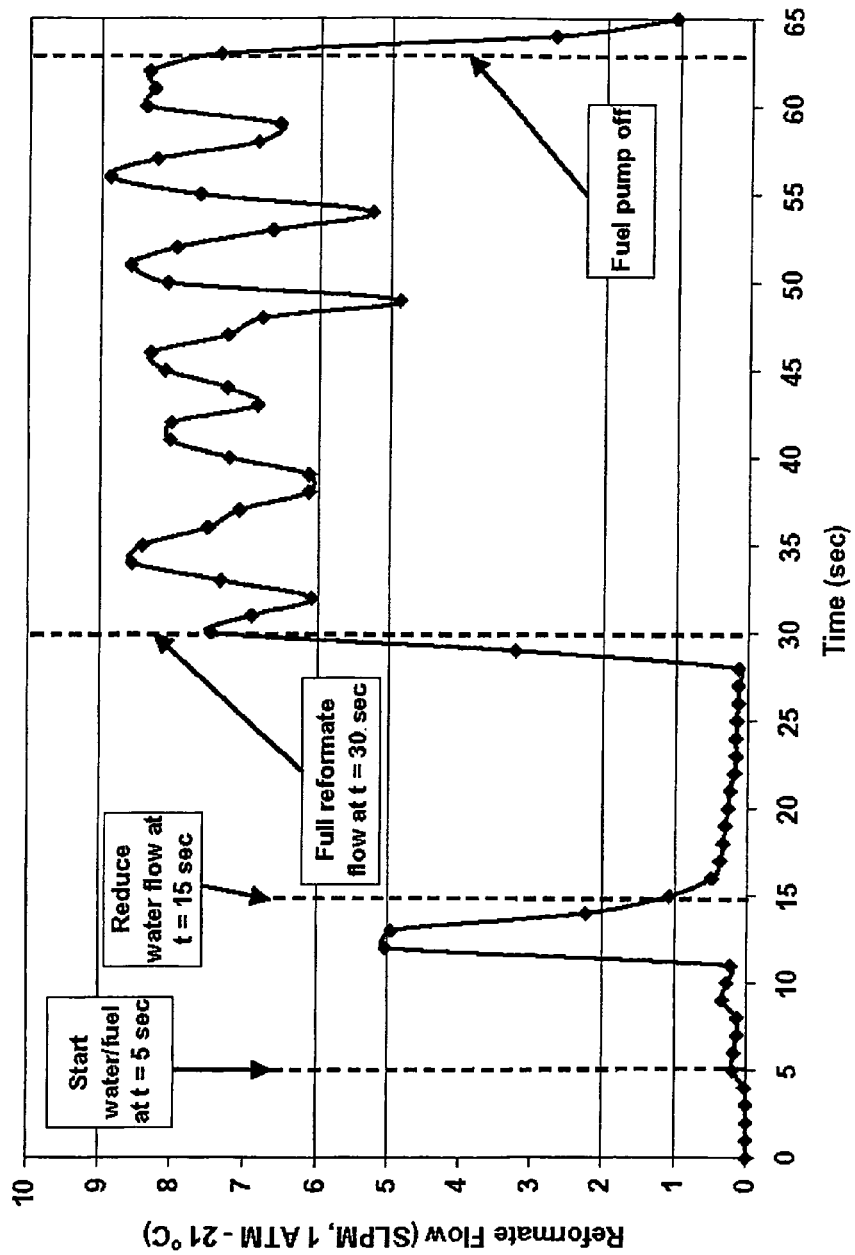
FIG. 16a-c are representative plots of data collected from the FIG. 2 system during rapid cold start up without recuperator bypass according to the examples.
Figure 16B:
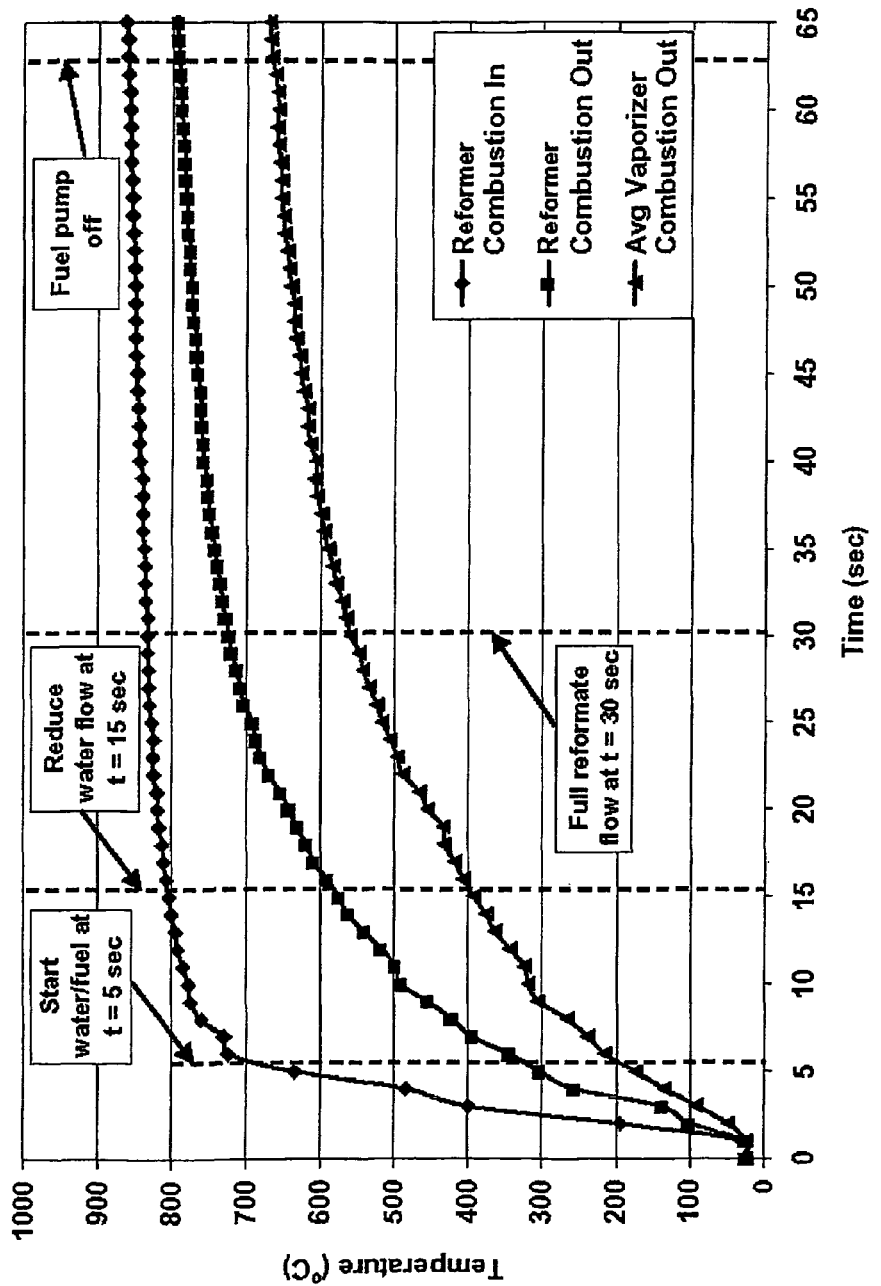
Figure 16C:
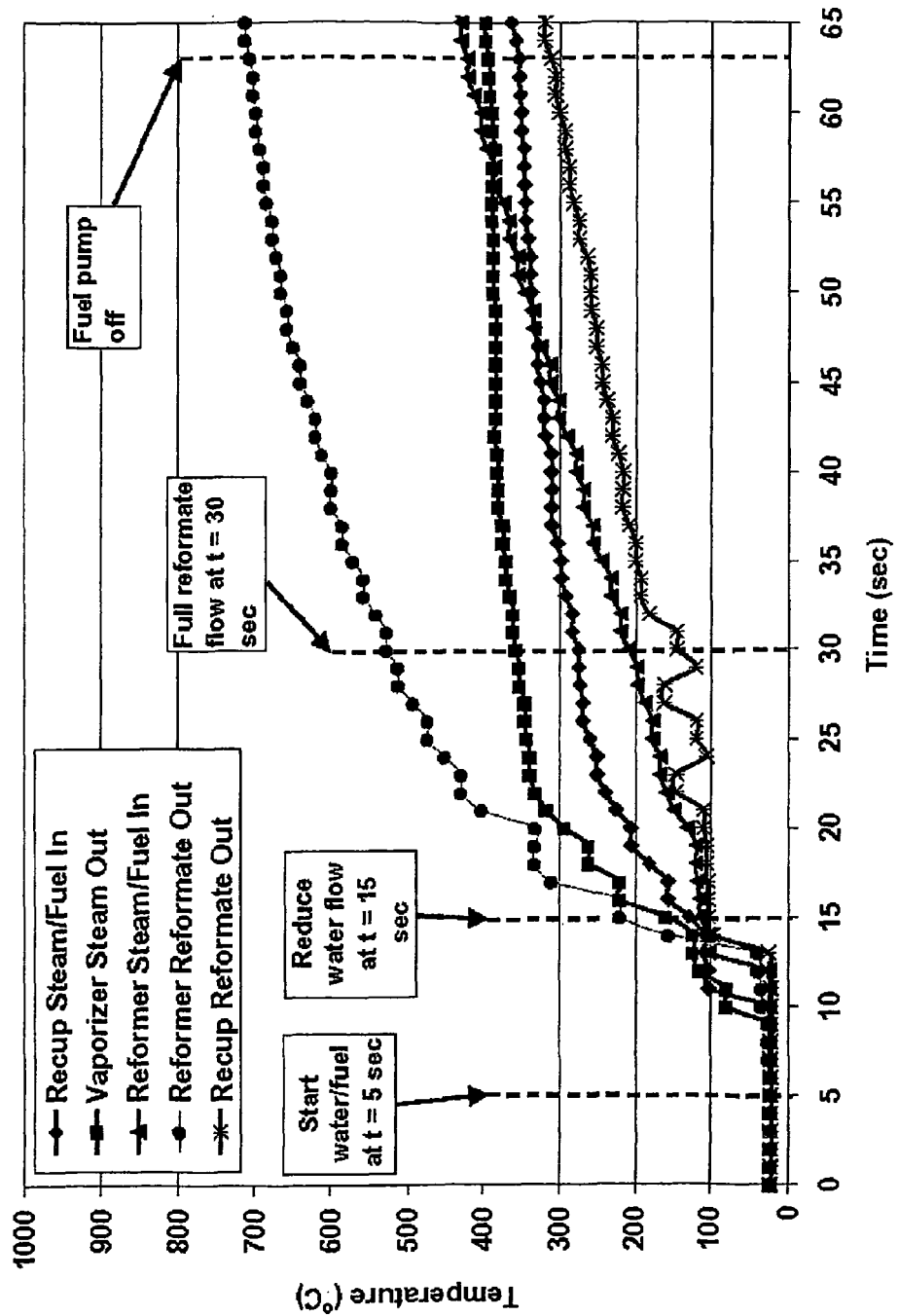
Figure 16D:
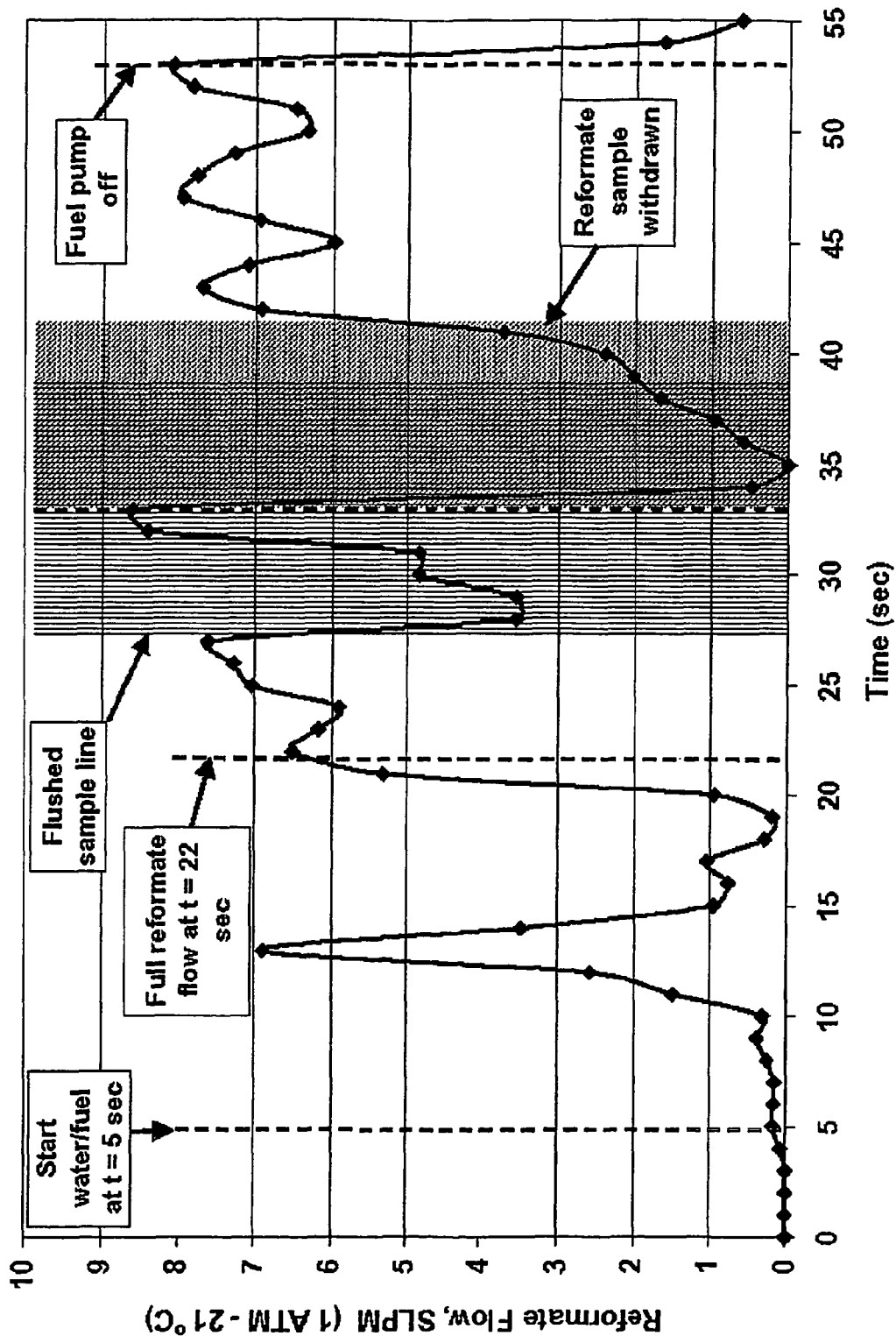
FIG. 16d-f are representative plots of data collected from the FIG. 2 system during rapid cold start up with recuperator bypass.
Figure 16E:
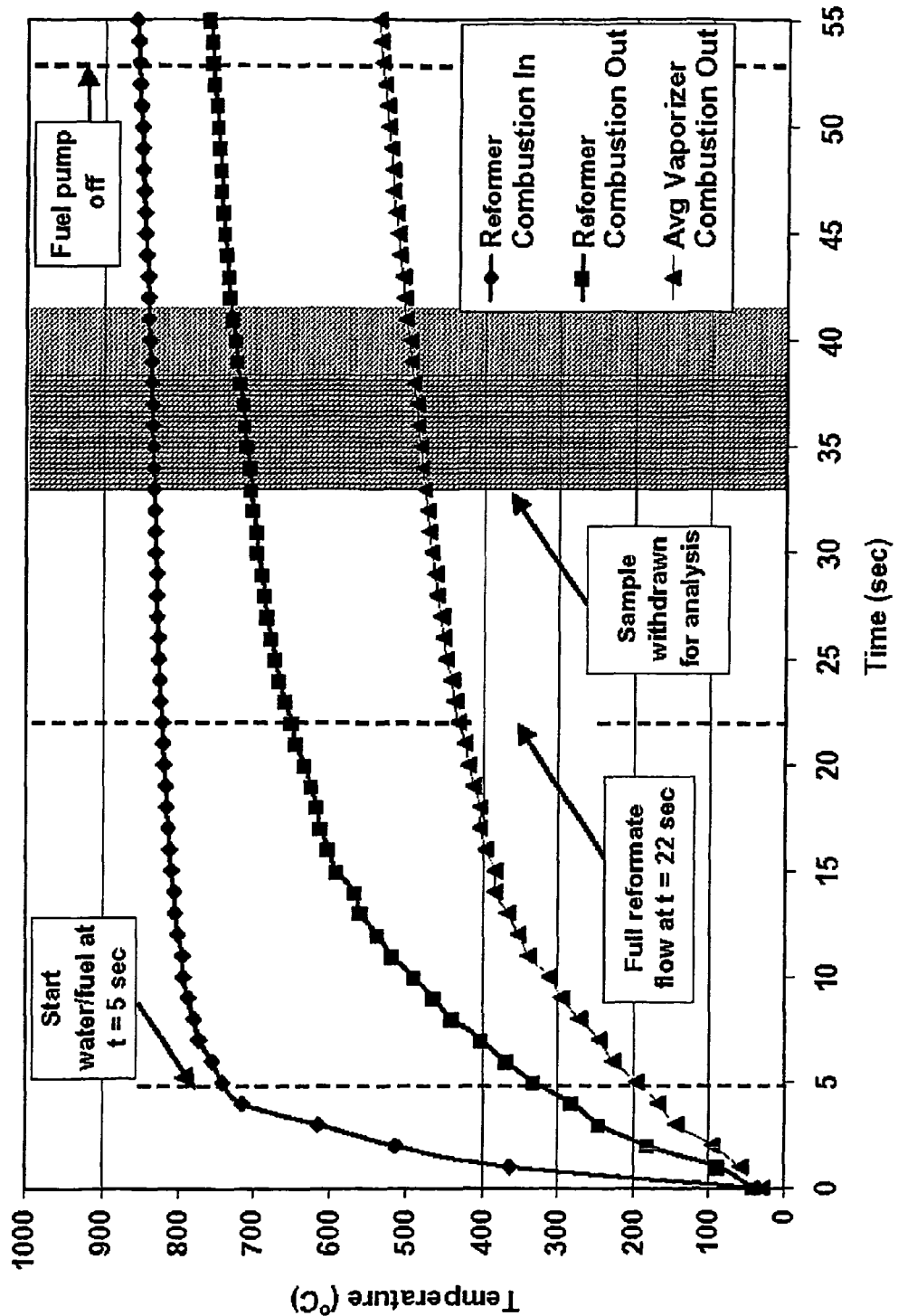
Figure 16F:
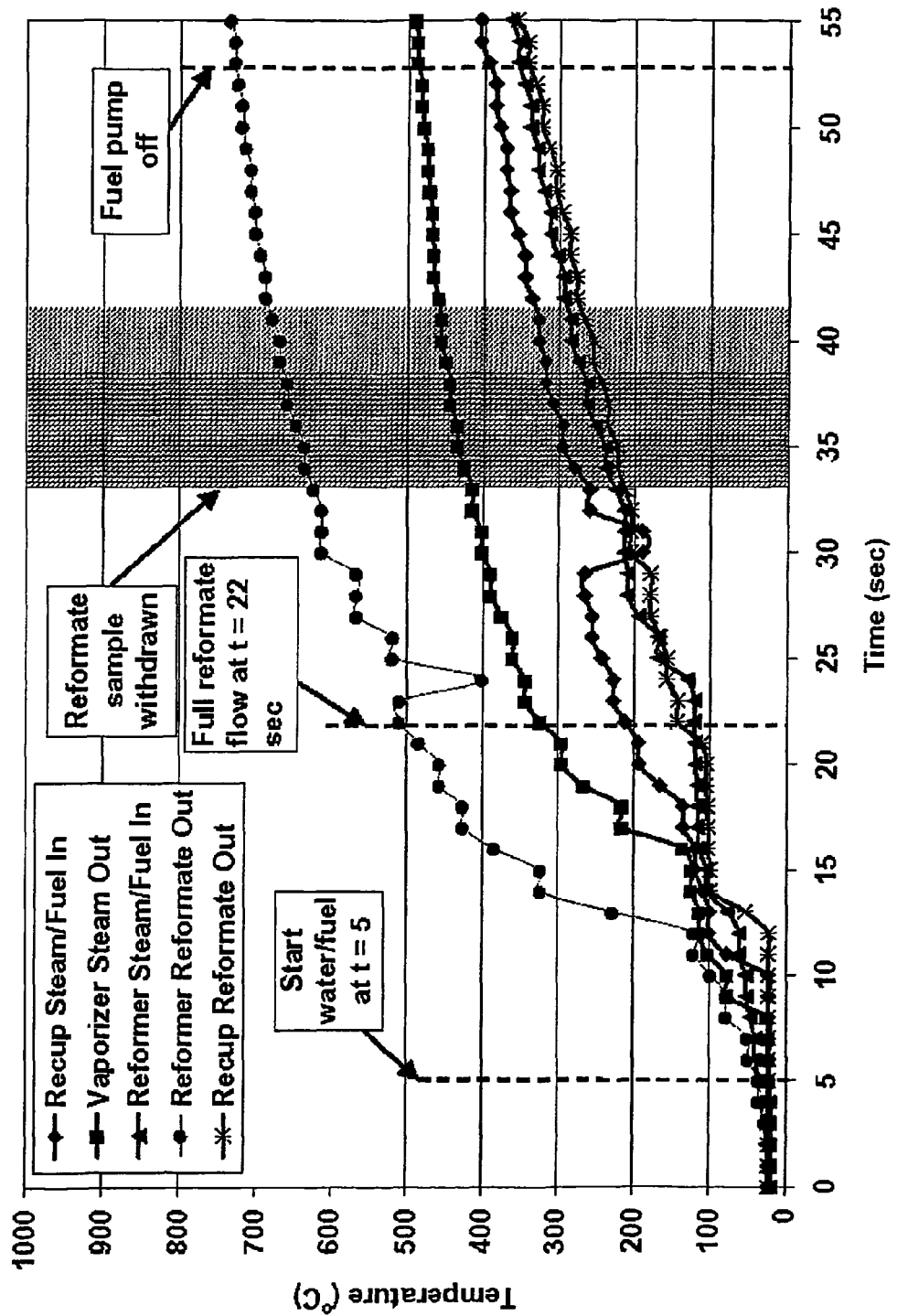

Reformate flow and system temperatures for two fast start tests are shown in FIGS. 16*a-f*. The air flow rate for the combustion process was 1000 slpm. A hydrogen flow of 100 slpm was mixed into the air stream using a micro-channel mixer, and ignited with a spark plug to generate the heat needed. FIGS. 16*a-c* represent a test with valve 108 shut and/or the recuperator bypass 106 not operational. FIG. 16*d-f* represent comparable results with the recuperator bypass 106 operational. A short pulse of gas flows from the system at about 12 seconds when steam displaces non-condensible gas from the system. Full reformate flow occurs in these two test at 30 seconds (FIG. 16*a*) and at 22 seconds (FIG. 16*d*). In the 22 second startup test, the flow is diverted to flush a sample line and then fill an evacuated sample cylinder. Gas chromatographic analysis of the reformate provided dry basis composition of 72.3% $H_2$, 6.1% CO, 19.1% $CO_2$ and 0.24% $CH_4$. The low conversion (69%) and higher than equilibrium CO concentration (4% was equilibrium) were believed to be due to a catalyst issue unrelated to the fast start testing. Temperatures on the combustion side (FIGS. 16*b*, 16*e*) are averages of 8 thermocouples spaced evenly across the panel cross section while temperatures on the reforming side (FIGS. 16*c*, 16*f*) represent single thermocouples. The oscillation in reformate production corresponds to the period of the piston stroke of the fuel pump. While a pulse dampener could eliminate the pulsation it may slow the transient response.

The test with the recuperator bypass achieved reformate production sooner but it is unclear if this was a result of the bypass or whether there may have been a reduced empty volume in the fuel injection line in the second test that resulted in earlier arrival of fuel at the reformer. Subsequent testing (data not shown) with the same system utilizing recuperator bypass achieved start up in 12 second. In these subsequent tests, the fuel pump was started at a higher than normal rate and, once there was evidence fuel reforming was occurring, the fuel pump was dialed down to steady state rate.

During start up, the steam to carbon (S:C) ratio (with 100% fuel flow) was targeted to be in the range of 18:1 to 24:1. As described above, this high rate of steam would deliver heat to the downstream WGS and PROX reactors to bring them up to operating temperature. Based on estimated masses of the downstream reactors and the planned steam rates, it is expected that the WGS and PROX reactors can be brought to operating temperature within about 60 seconds with the exceess heat at this S:C range.

At steady state, the combustion side flow rate was 100 to 110 slpm (ref 21.1° C.) and the pressure drop was ~1.1 inches $H_2O$ across the reactor and ~0.14 inches $H_2O$ across the vaporizer. In the current rapid start testing, at 30 seconds, when full reformate is being produced, the combustion side air flow rate was maintained at 1000 slpm while hydrogen was decreased over time to maintain the combustion inlet <1000 C. The pressure drop across the reactor and vaporizer panels was 14 and 8 inches respectively under the high flow high temperature condition.

Several changes are planned to improve the current system performance. First, the reactor will be fabricated in an Inconel alloy to allow high temperature operation. This will reduce the thermal mass of the reformer to <⅓ of the current value. An additional 40% of the reactor mass is expected to be eliminated through design changes. The total air flow being used will be reduced by using higher combustion temperatures at lower air flow rates. The greater temperature driving force along with the reduced velocity on the combustion gas side will be utilized to reduce the air flow volume and pressure requirement during startup (as well as at steady-state). Current targets are that the startup air flow for a 50 kWe system will be in the 450-600 scfm flow range with a maximum pressure drop in the 5" to 10" $H_2O$ range. The mechanical power input for a 75% efficient blower providing 600 scfm at 10" $H_2O$ is 931 watts which places the air movement within reach of a conventional lead-acid automotive battery.

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. A system comprising:
a fuel cell;
a steam reformer operable to produce hydrogen for use by the fuel cell from steam and hydrocarbons; and
a vaporizer for supplying the steam to the steam reformer;
wherein the steam reformer comprises a panel comprising stacked sheets defining a first face comprising one or more heating channel inlets and a second face comprising one or more heating channel outlets and a corresponding one or more heating channels extending therebetween, wherein the panel further comprises a plurality of reforming channels between respective pairs of adjacent sheets, the reforming channels being configured to reform hydrocarbon and steam and comprising a catalyst therefor, and wherein each of the one or more heating channels is configured to transfer heat from a fluid passing through therethrough to a fluid passing through the reforming channels, wherein the length and width of each face is substantially greater than the distance between the faces, such that each of the one or more heating channels is substantially shorter in length than each of the reforming channels.

2. The system of claim 1, wherein the smallest open dimension of each heating channel is less than about 0.05 inch.

3. The system of claim 2 wherein the vaporizer is a panel defining a first face and a second face having a multiplicity of vaporizer heating channels therethrough, wherein the vaporizer heating channels are downstream from the reformer heating channels.

4. The system of claim 3 further comprising variable speed blower means for conveying hot gas through the reformer and vaporizer heating channels at different flow rates during system start up and system operation.

5. The system of claim 4, wherein the hot gas comprises a combustion gas.

6. The system of claim 1 wherein there is no intervening heat exchanger between the heating sides of the steam reformer and the vaporizer.

7. The system of claim 6 wherein at least one of the vaporizer and the steam reformer define an inlet face defining inlets to heating side flow paths and an outlet face defining outlets to the heating side flow paths wherein each of the faces have a length and width substantially greater than the distance between the faces.

8. The system of claim 7 wherein the smallest dimension of the heating side flow paths is less than about 0.05 inch.

9. The system of claim 1, wherein the vaporizer and the stacked sheets of the reformer each comprises a stack of integrally bonded thin sheets, wherein recesses in the sheets define at least a portion of respective flow paths through each of the reformer and the vaporizer.

10. The system of claim 9 wherein the reformer stack of thin sheets is an alternating stack of heating side sheets and reforming side sheets, each of the heating side sheets and reforming side sheets including header holes aligned with an inlet and an outlet, wherein recesses in the heating side sheets define heating side flow channels and recesses in the reforming side sheets define reforming flow channels between the holes.

11. The system of claim 9 wherein the vaporizer stack of thin sheets is an alternating stack of heating side sheets and vaporizing side sheets, each of the heating side sheets and vaporizing side sheets including header holes aligned with an inlet and an outlet, wherein recesses in the heating side sheets define heating side flow channels and recesses in the vaporizing side sheets define vaporizing flow channels between the holes.

12. The system of claim 1, wherein the vaporizer has a heating side downstream from a heating side of the steam reformer.

13. The system of claim 12 further comprising at least one blower and a controller, wherein the controller is operable to selectively cause the at least one blower to convey a hot gas through the heating sides at substantially different mass flow rates during a start up phase and an operating phase of the system.

14. The system of claim 12, further comprising a combustion zone for supplying a hot gas to the heating side of the steam reformer.

15. The system of claim 1, wherein a start up period for increasing a temperature of the steam reformer from an ambient temperature to a substantially steady-state operating temperature is less than about 60 seconds.

* * * * *